United States Patent
Hsiang

(10) Patent No.: US 11,758,193 B2
(45) Date of Patent: Sep. 12, 2023

(54) SIGNALING HIGH-LEVEL INFORMATION IN VIDEO AND IMAGE CODING

(71) Applicant: MediaTek Inc., Hsinchu (TW)

(72) Inventor: Shih-Ta Hsiang, Hsinchu (TW)

(73) Assignee: HFI INNOVATION INC., Zhubei (TW)

(*) Notice: Subject to any disclaimer, the term of this patent is extended or adjusted under 35 U.S.C. 154(b) by 0 days.

(21) Appl. No.: 17/086,650

(22) Filed: Nov. 2, 2020

(65) Prior Publication Data

US 2021/0136419 A1 May 6, 2021

Related U.S. Application Data

(60) Provisional application No. 63/000,537, filed on Mar. 27, 2020, provisional application No. 62/958,624, filed on Jan. 8, 2020, provisional application No. 62/957,759, filed on Jan. 6, 2020, provisional application No. 62/954,023, filed on Dec. 27, 2019, provisional application No. 62/945,282, filed on Dec. 9, 2019, provisional application No. 62/930,088, filed on Nov. 4, 2019, provisional application No. 62/930,086, filed on Nov. 4, 2019.

(51) Int. Cl.
*H04N 19/70* (2014.01)
*H04N 19/172* (2014.01)
*H04N 19/184* (2014.01)

(52) U.S. Cl.
CPC .......... *H04N 19/70* (2014.11); *H04N 19/172* (2014.11); *H04N 19/184* (2014.11)

(58) Field of Classification Search
CPC ..... H04N 19/70; H04N 19/172; H04N 19/184
See application file for complete search history.

(56) References Cited

U.S. PATENT DOCUMENTS

| 2014/0056356 | A1 | 2/2014 | Yu et al. |
| 2015/0139296 | A1* | 5/2015 | Yu .................. H04N 19/103 |
| | | | 375/240.02 |

(Continued)

FOREIGN PATENT DOCUMENTS

| CN | 104737541 A | 6/2015 |
| CN | 104969557 A | 10/2015 |

(Continued)

OTHER PUBLICATIONS

Meeting Report of the 17th Meeting of the Joint Video Experts Team (JVET), Brussels, BE, Jan. 7-17, 2020; Sullivan et al.; retrieved Nov. 19, 2021 (Year: 2021).*

(Continued)

*Primary Examiner* — Jonathan R Messmore
(74) *Attorney, Agent, or Firm* — Oblon, McClelland, Maier & Neustadt, L.L.P.

(57) ABSTRACT

A method for for signaling high-level information in image and video coding is provided. A video decoder receives data from a bitstream to be decoded as a current picture of a video. The video decoder parses a picture header of the current picture that includes a set of one or more slice information syntax elements in the picture header for indicating presence of one or more types of slices that are present in the current picture. The video decoder reconstructs the slices of the current picture by using the set of slice information syntax elements.

9 Claims, 6 Drawing Sheets

(56) References Cited

U.S. PATENT DOCUMENTS

| | | | |
|---|---|---|---|
| 2015/0296224 A1* | 10/2015 | Davis | H04N 19/174 375/240.26 |
| 2016/0007034 A1* | 1/2016 | Bordes | H04N 19/176 375/240.13 |
| 2016/0241835 A1* | 8/2016 | Ikai | H04N 13/161 |
| 2016/0255359 A1* | 9/2016 | Yu | H04N 19/172 375/240.15 |
| 2019/0281301 A1* | 9/2019 | Misra | H04N 19/174 |
| 2020/0014925 A1* | 1/2020 | Lim | H04N 19/176 |
| 2020/0077119 A1* | 3/2020 | Wenger | H04N 19/174 |

FOREIGN PATENT DOCUMENTS

| | | |
|---|---|---|
| CN | 105684448 A | 6/2016 |
| KR | 20130118798 A | 10/2013 |

OTHER PUBLICATIONS

China National Intellectual Property Administration, International Search Report and Written Opinion for PCT/CN2020/126429, dated Jan. 29, 2021.

* cited by examiner

SIGNALING HIGH-LEVEL INFORMATION IN VIDEO AND IMAGE CODING

CROSS REFERENCE TO RELATED PATENT APPLICATION(S)

The present disclosure is part of a non-provisional application that claims the priority benefit of U.S. Provisional Patent Application Nos. 62/930,086, 62/930,088, 62/945,282, 62/954,023, 62/957,759, 62/958,624, and 63/000,537 filed on 4 Nov. 2019, 4 Nov. 2019, 9 Dec. 2019, 27 Dec. 2019, 6 Jan. 2020, 8 Jan. 2020, and 27 Mar. 2020, respectively. Contents of above-listed applications are herein incorporated by reference.

TECHNICAL FIELD

The present disclosure relates generally to delivery of video coding. In particular, the present disclosure relates to improving compression efficiency for signaling high-level information for coding image and video data.

BACKGROUND

Unless otherwise indicated herein, approaches described in this section are not prior art to the claims listed below and are not admitted as prior art by inclusion in this section.

High-efficiency video coding (HEVC) is the latest international video coding standard developed by the Joint Collaborative Team on Video Coding (JCT-VC). The input video signal is predicted from the reconstructed signal, which is derived from the coded picture regions. The prediction residual signal is processed by a linear transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In HEVC, a coded picture is partitioned into non-overlapped square block regions represented by the associated coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. A predictive (P) slice is decoded using intra prediction or inter prediction using at most one motion vector and reference index to predict the sample values of each block. An intra (I) slice is decoded using intra prediction only.

A CTU can be partitioned into multiple non-overlapped coding units (CUs) using the recursive quadtree (QT) structure to adapt to various local motion and texture characteristics. One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with other side information are entropy coded in the bitstream. FIG. 2 illustrates an example of the block partitioning (left) and its corresponding QT representation (right). The solid lines indicate the CU boundaries and the dashed lines indicate the TU boundaries.

The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

In Versatile Video Coding (VVC), a coded picture may also be partitioned into non-overlapped square block regions represented by CTUs. Each CTU can be partitioned into one or multiple smaller size coding units (CUs) by a quadtree with nested multi-type tree using binary and ternary split. The resulting CU partitions can be in square or rectangular shapes.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

The decoder receives data from a bitstream to be decoded as a current picture of a video. The decoder parses a picture header of the current picture that includes a set of one or more slice information syntax elements in the picture header for indicating presence of one or more types of slices that are present in the current picture. The set of slice information syntax elements may indicate whether a particular type of slice is present in the current picture. The set of slice information syntax elements may include one or more syntax element for indicating (i) whether a first type of slice is present in the current picture and (ii) whether a second, different type of slice is present in the current picture, where a slice of the first type of slices does not refer to information in pictures other than the current picture and a slice of the second type of slices refers to information in pictures other than the current picture.

When parsing the picture header, the video decoder may bypass parsing picture header syntax elements related to coding tools that are not associated with the one or more types of slices present in the current picture that are identified by the set of slice information syntax elements.

The decoder reconstructs the slices of the current picture by using the set of slice information syntax elements. In some embodiments, the set of slice information syntax elements includes a multi-slice-type syntax element that indicates whether the current picture includes slices of more than one slice types In some embodiments, a slice header of a slice of the current picture indicates a slice type when the multi-slice-type syntax element indicates that the current picture includes slices of more than one slice types. In some embodiments, the current picture refers to a picture parameter set (PPS) that includes a PPS syntax element that indicates whether slices of different slice types are allowed in the current picture. The picture header of the current picture includes the multi-slice-type syntax element when the PPS syntax element indicates that slices of more than one slice types are allowed.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

Figure 1:
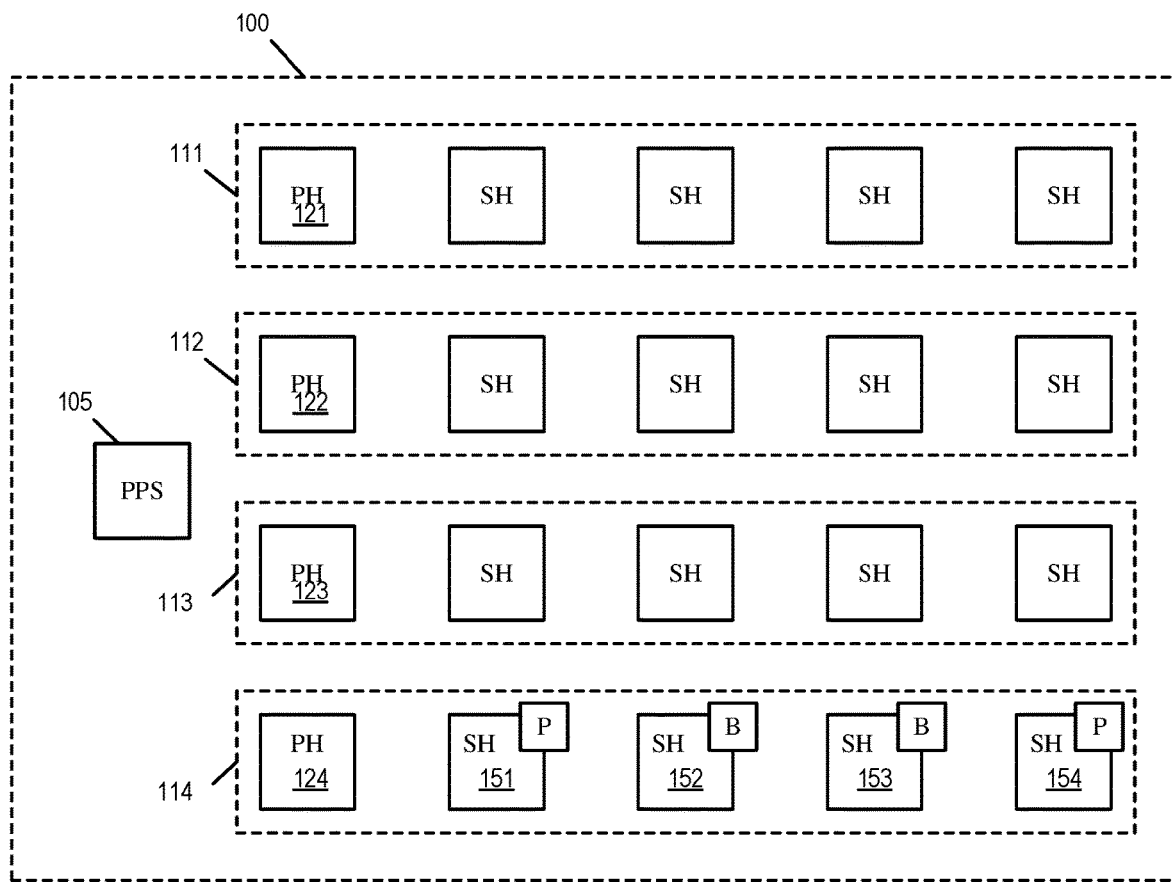
FIG. 1 conceptually illustrates a portion of a coded video in which syntax elements in picture headers are used to indicate whether certain type or types of slices are present in the corresponding pictures.
Figure 1:
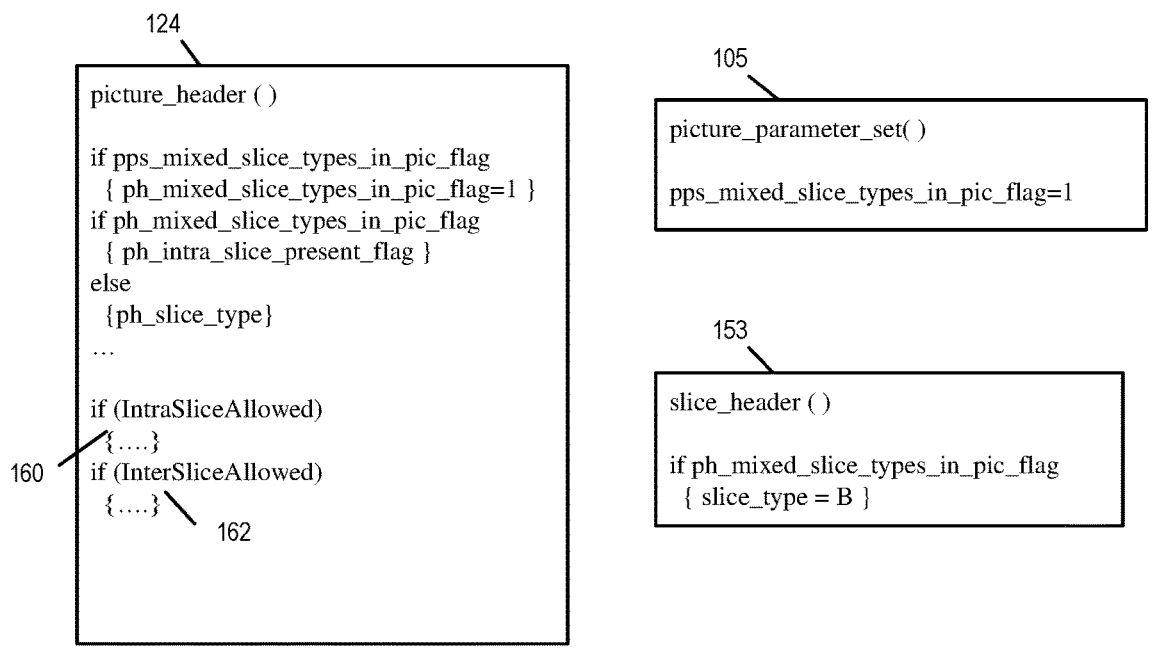

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Indicating Slice Types in High-Level Syntax

Some embodiments of the disclosure provide methods for improving compression efficiency for signaling high-level information for coding image and video data. In some embodiments, one or more high-level syntax (HLS) sets such as the video parameter set (VPS), the sequence parameter set (SPS), the picture parameter set (PPS) and the picture header set may further comprise multiple syntax elements for indicating the slice types that may be present in the associated data structures. In this way, a video coder can skip encoding or decoding the syntax elements in a current HLS set related to the coding tools not associated with any slice types present in the associated data structure (that are referred to the current HLS set). For example, in some embodiments, a video coder may further include one or more syntax elements in a current SPS for indicating the slice types that may be present in the associated coded video sequence that is referred to by the current SPS. When said one or more syntax elements in the SPS indicates that the I-slice is the only slice type present in the associated coded video sequence, a video coder can skip coding all the SPS syntax elements not related to I-slices (e.g., inter prediction tools and other tools not applicable in a I-slice).

(a) Signaling Presence of Type(s) of Slices

In some embodiments, a picture header is signaled for each coded picture. The picture header may further include one or more syntax elements for indicating the slice types that may be present in the current picture. In this way, a video coder can skip encoding or decoding the picture header syntax elements related to the coding tools not associated with any slice types present in the current picture. For example, when the picture header indicates that the I slice is the only slice type present in the current coded picture, a video coder may skip coding all the picture header syntax elements that are not related to I-slices (e.g., inter prediction tools and others not applicable to a I-slice).

In some embodiments, the picture header may further include one or more syntax elements to indicate the collections of the slice types that may be present in a current picture. In some embodiments, a video coder signals a syntax element ph_slice_types in the picture header. Tables 1 and 2 provide two example tables for interpreting the syntax values of ph_slice_types. Specifically, the tables show the mapping of syntax values for slice_type that may be present in an associated data structure.

TABLE 1

| syntax value | slice_type(s) or pic_type(s) that may be present |
|---|---|
| 0 | B |
| 1 | P |
| 2 | I |
| 3 | B, P, I |

TABLE 2

| syntax value | slice_type(s) or pic_type(s) that may be present |
|---|---|
| 0 | reversed |
| 1 | I |
| 2 | P |
| 3 | P, I |
| 4 | B |
| 5 | B, I |
| 6 | B, P |
| 7 | B, P, I |

In some embodiments, the picture header may include multiple syntax flags to indicate whether certain slice types may be present in the current picture. In some embodiments, the SPS may include three syntax flags sps_slice_B_present, sps_slice_P_present, and sps_slice_I_present to indicate whether B slices, P slices, and I slices are respectively present in the coded pictures from a codec video sequence that the current SPS is referred to. Similarly, the PPS may include three syntax flags pps_slice_B_present, pps_slice_P_present, and pps_slice_I_present to indicate whether B slices, P slices, and I slices are respectively present in the coded pictures that refer to the current SPS. In some embodiments, the picture header may include three syntax flags in the picture header ph_slice_B_present, ph_slice_P_present, and ph_slice_I_present, respectively, to indicate whether B slices, P slices, and I slices are present in the current picture, the refers to the picture header.

In some embodiments, a video coder signals information in the picture header for deriving the variable phPicType indicating the slices types that may be present in the current picture. Tables 3 and 4 provide two example tables for mapping or interpreting the syntax value of phPicType:

TABLE 3

| syntax value | slice_type(s) or pic_type(s) that may be present |
|---|---|
| 0 | I |
| 1 | P, I |
| 2 | B, P, I |

TABLE 4

| syntax value | slice_type(s) or pic_type(s) that may be present |
|---|---|
| 0 | I |
| 1 | P, I |
| 2 | B, P, I |
| 3 | B |
| 4 | P |
| 5 | B, P |
| 6 | P, I |

Table 4 is extended from Table 3 for interpreting the syntax elemenet pic_type in a access unit delimiter (AUD). Thus, signaling information for deriving the variable phPicType can be conditioned on the value of pic_type signaled in the associated AUD when present. In some embodiments, the AUD is constrained to be always signaled for each access unit. Signaling information for deriving the variable phPicType can be conditioned on the value of pic_type signaled in the associated AUD. For example, when pic_type signaled in the associated AUD is equal to 0, a video coder can skip encoding or decoding information for deriving the variable phPicType in the current picture header and phPicType is inferred to be equal to 0.

In some embodiments, a video coder may have more than one high-level syntax sets including multiple syntax elements for signaling the slice types that may be present in the respectively associated data structures with the same interpretation of the syntax elemenet values. For example, a video coder may have both the SPS and the AUD that include a syntax element for indicating the slice types that may be present in the respectively associated data structures with the same interpretation of the syntax elemenet as shown in Tables 1-4 above.

In some embodiments, a syntax element intra_only_constraint_flag is signaled to specify the constraint on the allowed slice type. In some embodiments, signaling information for deriving the syntax elements for signaling the slice types that may be present in the respectively associated data structures can be further conditioned on the value of the syntax element intra_only_constraint_flag. In some embodiments, when intra_only_constraint_flag is equal to 1, a video coder can skip encoding or decoding the syntax elements not related to the coding tools not associated with the I-slice type.

In some embodiments, one or more high-level syntax (HLS) sets such as the video parameter set (VPS), the sequence parameter set (SPS), the picture parameter set (PPS) and/or the picture header (PH) may include one or more syntax elements for indicating the network abstraction layer (NAL) unit types that may be present in the current picture. In this way, a video coder may skip encoding or decoding the picture header syntax elements related to the coding tools not associated with any NAL unit types present in the associated data structures. For example, when the picture header indicates that instantaneous decoding refresh (IDR) unit types are present, a video coder can skip encoding or decoding the reference picture list syntax elements in the current picture.

In some embodiments, a video coder can signal one or more signal syntax elements related to use of gradual decoding refresh (GDR) in one or more high-level syntax (HLS) sets such as VPS, SPS, PPS, and/or picture header. In some embodiments, the syntax elements related to GDR is signaled in a picture header conditioned on the values of the GDR-related syntax element in the high-level syntax set referred to by the current picture. In some embodiments, in the picture header, the syntax element ph_pic_parameter_set_id specifying the selected PPS index is signaled before the syntax element gdr_pic_flag to specify whether the current picture is a GDR picture. When the syntax element gdr_enabled_flag is equal to 0 in the SPS that is referred to by the selected PPS in a current picture header, coding gdr_pic_flag is skipped in the current picture header. The syntax element gdr_pic_flag is inferred to be equal to 0 when not present. Table 5 below shows an example syntax table of a picture header showing syntax elements related to GDR:

TABLE 5

| | Descriptor |
|---|---|
| picture_header_rbsp( ) { | |
|   non_reference_picture_flag | u(1) |
|   ph_pic_parameter_set_id | ue(v) |
|   if( gdr_enabled_flag ) { | |
|     gdr_pic_flag | u(1) |
|     if( gdr_pic_flag ) | |
|       recovery_poc_cnt | ue(v) |
|   } | |
|   no_output_of_prior_pics_flag | u(1) |
|   ... | |
| } | |

In some embodiments, an HLS set such as VPS, SPS and PPS may further include one or more syntax elements for indicating the slice types that may be present in the associated data structure. In this way, coding the HLS elements related to the coding tools not associated with any slice type present in the associated data structure can be skipped. For example, a video coder may encode or decode one or more syntax elements in a current PPS for indicating the slice types that may be present in the associated coded picture (that refers the current PPS). When one or more added syntax elements in the PPS indicates that the !-slice is the only slice type present in the associated coded picture, a video coder may skip coding all the PPS syntax elements not related to I-slices (e.g., inter prediction tools and other tools not applicable in a I-slice). In some embodiments, the PPS may further include a syntax element denoted by pps_pic_type. The interpretation of the values of pps_pic_type can be specified by one of the example mappings according to Tables 1-4 above.

In some embodiments, a video coder may encode or decode the picture header syntax elements for indicating the slice types that may be present in a current picture conditioned on the related information, when present, in the high-level syntax set referred to by the current picture header. In one example. a video coder may encode or decode three syntax flags in the picture header, denoted by ph_slice_B_present_flag, ph_slice_P_present_flag, and ph_slice_I_present_flag, to indicate whether B slices, P slices, and I slices are present in the current picture, respectively. When the PPS referred to by a current picture header indicates that only the I slice type is present in the current picture, the video coder can infer ph_slice_I_present_flag to be equal to 1, ph_slice_B_present_flag and ph_slice_P_present_flag both equal to 0, and skip encoding or decoding the three syntax flags. The video coder can further skip encoding or decoding the syntax elements related to inter prediction in the current picture header. Alternatively, the PPS may include three syntax flags, denoted by pps_slice_B_present, pps_slice_P_present, and pps_slice_I_present, to indicate whether B slices, P slices, and I slices are respectively present in the coded pictures referring to the current PPS.

In some embodiments, a video coder can signal or derive information in a picture header for indicating whether more than one slice type may be present in a current picture. When it is indicated that only one slice type is present in the current picture, the video coder can further encode or decode the slice type (B, P, or I) that is present in the current picture. The video coder can further skip encoding or decoding information related to the slice type in the associated slices of the current picture, wherein the slice type in the associated slices of the current picture is inferred to be the same as the coded slice type in the picture header. When it is indicated that more than one slice type may be present in the current picture, the video coder may further encode or decode information for deriving possible slice types that may be present in the current picture. The video coder can further skip encoding or decoding the values of the syntax elements related to the coding tools that are applicable only to the unused slice types.

In some embodiments, the video coder may signal one or more syntax elements in one or more HLS sets such as the SPS and the PPS to indicate whether it is allowed to have more than one slice type present in a picture for all the associated pictures referring to the said one or more HLS sets. When the signaled HLS information indicates that it is not allowed to have more than one slice type present in each associated picture, the video coder can infer that only one slice type is present in a current picture for all the associated pictures referring to the said one or more HLS sets and further skip encoding or decoding the related syntax elements in the picture header for indicating whether more than one slice type may be present in a current picture. The video coder may further signal another one or more syntax elements in the said one or more HLS sets for indicating whether each picture referring to the said one or more than HLS sets is further partitioned into more than one slice. The one or more syntax elements are signaled before (in decoding order) the aforementioned one or more syntax elements for indicating whether each associated picture may have more than one slice type present. When another one or more coded syntax element indicates that each associated picture referring to the one or more HLS sets contains only one slice, the video coder can infer that there is only one slice type is present in the associated picture and skips encoding or decoding the aforementioned one or more syntax elements for indicating whether each associated picture may have more than one slice type present.

In some embodiments, a video coder can signal or derive information in a picture header or other HLS sets for indicating whether more than one VCL NAL type may be present in a current picture. When it is signaled first that the current picture contains only one slice, the video coder can infer that only one VCL NAL type is present in the current picture. For example, a video coder may signal the syntax element mixed_nalu_types_in_pic_flag, which specifies whether each picture refering to the PPS has the same value of nal_unit_type. In some embodiments, the syntax element mixed_nalu_types_in_pic_flag is moved (positioned) after the syntax element no_pic_partition_flag and is coded only if the syntax element no_pic_partition_flag is equal to 0, as shown in Table 6 below. Since mixed_nalu_types_in_pic_flag is related to using subpicture partitioning associated with rectangular slice partitioning mode, coding the syntax element mixed_nalu_types_in_pic_flag can be further conditioned on whether the rectangular slice partitioning is in use and the number of slices in the current picture.

For some embodiments, Tables 6-8 below provides example HLS syntax tables for PPS, picture header, and slice header, respectively.

TABLE 6

Example high-level syntax table of a PPS

| | Descriptor |
|---|---|
| pic_parameter_set_rbsp( ) { | |
|     pps_pic_parameter_set_id | ue(v) |
|     pps_seq_parameter_set_id | u(4) |
|     ..... | |
|     no_pic_partition_flag | u(1) |
|     if( no_pic_partition_flag ) { | |
|         pps_log2_ctu_size_minus5 | u(2) |
|         num_exp_tile_columns_minus1 | ue(v) |
|         num_exp_tile_rows_minus1 | ue(v) |
|         for( i = 0; i <= num_exp_tile_columns_minus1; i++ ) | |
|             tile_column_width_minus1[ i ] | ue(v) |
|         for( i = 0; i <= num_exp_tile_rows_minus1; 1++ ) | |
|             tile_row_height_minus1[ i ] | ue(v) |
|         rect_slice_flag | u(1) |
|         if( rect_slice_flag ) | |
|             single_slice_per_subpic_flag | u(1) |
|     .... | |
|     if( (rect_slice_flag & & num_slices_in_pic_minus1 = = 0) ) | |

TABLE 6-continued

Example high-level syntax table of a PPS

| | Descriptor |
|---|---|
| pps_mixed_slice_types_in_pic_flag | u(1) |
| if( rect_slice_flag && num_slices_in_pic_minus1 > 0 ) | |
|    mixed_nalu_types_in_pic_flag | u(1) |
| .... | |
| } | |

TABLE 7

Example high-level syntax table of a picture header.

| | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( pps_mixed_slice_types_in_pic_flag ) | |
|     ph_mixed_slice_types_in_pic_flag | |
|   if( ph_mixed_slice_types_in_pic_flag ) { | |
|     ph_slice_B_present_flag | u(1) |
|     ph_slice_P_present_flag | u(1) |
|     ph_slice_I_present_flag | u(1) |
|   } else { | |
|     ph_slice_type | ue(v) |
|     ph_slice_B_present_flag = ph_slice_type == B ? 1: 0 | |
|     ph_slice_P_present_flag = ph_slice_type == P ? 1: 0 | |
|     ph_slice_I_present_flag = ph_slice_type == I ? 1: 0 | |
|   } | |
|   .... | |
|   if( ph_slice_B_present_flag || ph_slice_P_present_flag ) { | |
|     if( sps_temporal_mvp_enabled_flag ) | |
|       pic_temporal_mvp_enabled_flag | u(1) |
|     if(pps_mvd_l1_zero_idc && ph_slice_B_present_flag ) | |
|       mvd_l1_zero_flag | u(1) |
|     if( pps_six_minus_max_num_merge_cand_plus1 ) | |
|       pic_six_minus_max_num_merge_cand | ue(v) |
|     if( sps_affine_enabled_flag) | |
|       pic_five_minus_max_num_subblock_merge_cand | ue(v) |
|     if( sps_fpel_mmvd_enabled_flag ) | |
|       pic_fpel_mmvd_enabled_flag | u(1) |
|     if( sps_bdof_pic_present_flag ) | |
|       pic_disable_bdof_flag | u(1) |
|     if( sps_dmvr_pic_present_flag ) | |
|       pic_disable_dmvr_flag | u(1) |
|     if( sps_prof_pic_present_flag ) | |
|       pic_disable_prof_flag | u(1) |
|     if( sps_triangle_enabled_flag && MaxNumMergeCand >= 2 && pps_max_num_merge_cand_minus_max_num_triangle_cand_plus1 ) | |
|       pic_max_num_merge_cand_minus_max_num_triangle_cand | ue(v) |
|   } | |
|   .... | |
| } | |

TABLE 8

Example high-level syntax table of a slice header

| | Descriptor |
|---|---|
| slice_header( ) { | |
|   slice_pic_order_cnt_lsb | u(v) |
|   if( subpics_present_flag ) | |
|     slice_subpic_id | u(v) |
|   if( rect_slice_flag || NumTilesInPic > 1 ) | |
|     slice_address | u(v) |
|   if( rect_slice_flag && NumTilesInPic > 1 ) | |
|     num_tiles_in_slice_minus1 | ue(v) |

TABLE 8-continued

Example high-level syntax table of a slice header

| | Descriptor |
|---|---|
|   if( ph_mixed_slice_types_in_pic_flag ) | |
|     slice_type | ue(v) |
|   .... | |
| } | |

The syntax element pps_mixed_slice_types_in_pic_flag in a PPS indicates whether it is allowed to have more than one slice type present in a picture for all the pictures referring to the PPS. The syntax element ph_mixed_slice_types_in_pic_flag in a current picture header indicates whether more than one slice type may be present in a current picture. When the value of pps_mixed_slice_types_in_pic_flag is equal to 0, it is not allowed to have more than one slice type present in a current picture referring to the PPS. The value of ph_mixed_slice_types_in_pic_flag is not coded and is inferred to be equal to 0. When the value of ph_mixed_slice_types_in_pic_flag is equal to 0, the value of the syntax element slice_type in the slice header is not coded and is inferred to be equal to the value of ph_slice_type. The values of the syntax elements in the picture header related to the coding tools that are only applied to the unused slice types can be further skipped. When ph_mixed_slice_types_in_pic_flag is equal to 1, the possible slice types in the current picture are signaled by the syntax elements denoted by ph_slice_B_present_flag, ph_slice_P_present_flag, and ph_slice_I_present_flag to indicate whether B slices, P slices, and I slices may be present in the current picture, respectively.

(b) Signaling Multiple Slice Types

In some embodiments, the syntax element mixed_slice_types_in_pic_flag in a PPS indicates whether it is allowed to have more than one slice type present in a picture for all the pictures referring to the PPS. When pps_mixed_slice_types_in_pic_flag is equal to 0, the syntax element ph_slice_type specifies the only one slice type present in the current header. The values of the syntax elements in the picture header related to the coding tools that are only applied to the unused slice types are further skipped. The value of the syntax element slice_type in the slice header can be inferred from the coded value of ph_slice_type. Tables 9-11 respectively shows syntax tables of PPS, picture header, and slice header that use pps_mixed_slice_types_in_pic_flag.

TABLE 9

| | Descriptor |
|---|---|
| pic_parameter_set_rbsp( ) { | |
|   pps_pic_parameter_set_id | ue(v) |
|   pps_seq_parameter_set_id | u(4) |
|   ... | |
|   ... | |
|   no_pic_partition_flag | u(1) |
|   if( no_pic_partition_flag ) { | |
|   ..... | |
|   if( rect_slice_flag && num_slices_in_pic_minus1 > 0) ) | |
|     mixed_nalu_types_in_pic_flag | u(1) |
|   if( (rect_slice_flag && num_slices_in_pic_minus1 == 0) ) | |
|     mixed_slice_types_in_pic_flag | u(1) |
|     ... | |
|   } | |
|   ... | |
| } | |

TABLE 10

| | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
|   if( mixed_slice_types_in_pic_flag ) | |
|     ph_slice_type | ue(v) |
|   ... | |
|   if( partition_constraints_override_enabled_flag ) { | |
|     partition_constraints_override_flag | u(1) |
|     if( partition_constraints_override_flag ) { | |
|       if( mixed_slice_types_in_pic_flag || ph_slice_type = I ) { | |
|         pic_log2_diff_min_qt_min_cb_inter_slice | ue(v) |
|         pic_max_mtt_hierarchy_depth_inter_slice | ue(v) |
|         if( pic_max_mtt_hierarchy_depth_inter_slice = 0 ) { | |
|           pic_log2_diff_max_bt_min_qt_inter_slice | ue(v) |
|           pic_log2_diff_max_tt_min_qt_inter_slice | ue(v) |
|         } | |
|       } | |
|       if( mixed_slice_types_in_pic_flag || ph_slice_type == I ) { | |
|         pic_log2_diff_min_qt_min_cb_intra_slice_luma | ue(v) |
|         pic_max_mtt_hierarchy_depth_intra_slice_luma | ue(v) |
|         if( pic_max_mtt_hierarchy_depth_intra_slice_luma = 0 ) { | |
|           pic_log2_diff_max_bt_min_qt_intra_slice_luma | ue(v) |
|           pic_log2_diff_max_tt_min_qt_intra_slice_luma | ue(v) |
|         } | |
|         if( qtbtt_dual_tree_intra_flag ) { | |
|           pic_log2_diff_min_qt_min_cb_intra_slice_chroma | ue(v) |
|           pic_max_mtt_hierarchy_depth_intra_slice_chroma | ue(v) |
|           if( pic_max_mtt_hierarchy_depth_intra_slice_chroma | |

TABLE 10-continued

| | Descriptor |
|---|---|
| = 0 ) { | |
|     pic_log2_diff_max_bt_min_qt_intra_slice_chroma | ue(v) |
|                     pic_log2_diff_max_tt_min_qt_intra_slice_chroma | ue(v) |
|         } | |
|       } | |
|     } | |
|   } | |
| } | |
| ... | |
| if( cu_qp_delta_enabled_flag ) { | |
|   if( mixed_slice_types_in_pic_flag \|\| ph_slice_type = = I ) | |
|     pic_cu_qp_delta_subdiv_intra_slice | ue(v) |
|   if( mixed_slice_types_in_pic_flag \|\| ph_slice_type = I ) | |
|     pic_cu_qp_delta_subdiv_inter_slice | ue(v) |
| } | |
| if( pps_cu_chroma_qp_offset_list_enabled_flag ) { | |
|   if( mixed_slice_types_in_pic_flag \|\| ph_slice_type = = I ) | |
|     pic_cu_chroma_qp_offset_subdiv_intra_slice | ue(v) |
|   if( mixed_slice_types_in_pic_flag \|\| ph_slice_type = I ) | |
|     pic_cu_chroma_qp_offset_subdiv_inter_slice | ue(v) |
| } | |
| if( mixed_slice_types_in_pic_flag \|\| ph_slice_type = I ) { | |
|   if( sps_temporal_mvp_enabled_flag ) | |
|     pic_temporal_mvp_enabled_flag | u(1) |
|   if(pps_mvd_l1_zero_idc && (mixed_slice_types_in_pic_flag \|\| ph_slice_type == B) | |
|     mvd_l1_zero_flag | u(1) |
|   if( pps_six_minus_max_num_merge_cand_plus1 ) | |
|     pic_six_minus_max_num_merge_cand | ue(v) |
|   if( sps_affine_enabled_flag ) | |
|     pic_five_minus_max_num_subblock_merge_cand | ue(v) |
|   if( sps_fpel_mmvd_enabled_flag ) | |
|     pic_fpel_mmvd_enabled_flag | u(1) |
|   if( sps_bdof_pic_present_flag && (mixed_slice_types_in_pic_flag \|\| ph_slice_type == B)) | |
|     pic_disable_bdof_flag | u(1) |
|   if( sps_dmvr_pic_present_flag && (mixed_slice_types_in_pic_flag \|\| ph_slice_type == B)) | |
|     pic_disable_dmvr_flag | u(1) |
|   if( sps_prof_pic_present_flag ) | |
|     pic_disable_prof_flag | u(1) |
|   if( sps_triangle_enabled_flag && MaxNumMergeCand >= 2 && pps_max_num_merge_cand_minus_max_num_triangle_cand_plus1 ) | |
|     pic_max_num_merge_cand_minus_max_num_triangle_cand | ue(v) |
| } | |
| ... | |
| rbsp_trailing_bits( ) | |
| } | |

TABLE 11

| | Descriptor |
|---|---|
| slice_header ( ) { | |
|   slice_pic_order_cnt_lsb | u(v) |
|   if( subpics_present_flag ) | |
|     slice_subpic_id | u(v) |
|   if( rect_slice_flag \|\| NumTilesInPic > 1 ) | |
|     slice_address | u(v) |
|   if( rect_slice_flag && NumTilesInPic > 1 ) | |
|     num_tiles_in_slice_minus1 | ue(v) |
|   if( mixed_slice_types_in_pic_flag | |
|     slice_type | ue(v) |
|   ... | |
| } | |

In PPS RBSP (as shown in Table 9), the syntax element mixed_nalu_types_in_pic_flag being 1 specifies that each picture referring to the PPS has more than one VCL NAL unit and that the VCL NAL units do not have the same value of nal_unit_type and that the picture is not an IRAP picture. The value of mixed_nalu_types_in_pic_flag being equal to 0 specifies that each picture referring to the PPS has one or more VCL NAL units and the VCL NAL units of each picture refering to the PPS have the same value of nal_unit_type. When not present, the value of mixed_nalu_types_in_pic_flag is inferred to be equal to 0. When no_mixed_nalu_types_in_pic_constraint_flag is equal to 1, the value of mixed_nalu_types_in_pic_flag shall be equal to 0.

For each slice with a nal_unit_type value nalUnitTypeA in the range of IDR_W RADL to CRA_NUT, inclusive, in a picture picA that also contains one or more slices with another value of nal_unit_type (i.e., the value of mixed_nalu_types_in_pic_flag for the picture picA is equal to 1), the following applies:

The slice shall belong to a subpicture subpicA for which the value of the corresponding subpic_treated_as_pic_flag[i] is equal to 1.

The slice shall not belong to a subpicture of picA containing VCL NAL units with nal_unit_type not equal to nalUnitTypeA.

For all the following PUs in the CLVS in decoding order, neither RefPicList[0] nor RefPicList[1] of a slice in subpicA shall include any picture preceding picA in decoding order in an active entry.

The value of mixed_slice_types_in_pic_flag being equal to 1 specifies that each picture referring to the PPS may have more than one slice type present in the current picture. The value of mixed_slice_types_in_pic_flag being equal to 0 specifies that each picture referring to the PPS has one type present in the current picture. When not present, the value of mixed_slice_types_in_pic_flag is inferred to be equal to 0.

In the picture header RBSP (as shown in Table 10), the syntax element ph_slice_type specifies the value of slice_type in all the slice headers in the current picture when mixed_slice_types_in_pic_flag is equal to 0.

In the slice header (as shown in Table 11), the syntax element slice_type specifies the coding type of the slice. When not present, the value of slice_types is inferred to be equal to the value of ph_slice_type. (The values of slice_type associated with different slice types are shown in Table 23 below.)

(c) Signaling a Mix of Different Slice Types

In some embodiments, the video coder indicates whether the inter slice type (B or P) and the intra slice type (I) may be present in a current picture. The syntax element ph_mixed_slice_types_in_pic_flag is further added to the picture header to indicates whether more than one slice type may be present in a current picture. When ph_mixed_slice_types_in_pic_flag is equal to 1, a syntax element ph_intra_slice_present_flag is further signaled to indicate whether the slice type I may be present in the current picture. The variables InterSlicePresent and IntraSlicePresent indicate whether any inter slice (slice type B or P) and any intra slice (slice type I) may be present in a current picture, respectively. The variables InterSlicePresent and IntraSlicePresent can be derived from the values of ph_mixed_slice_types_in_pic_flag, ph_intra_slice_present_flag, and ph_slice_type. In the slice header, the information on slice_type is signaled dependent on the values of ph_mixed_slice_types_in_pic_flag and IntraSlicePresent. Tables 12 and 13 below respectively show a picture header and a slice header in which syntax elements indicate whether inter slice and intra slice may be present:

TABLE 12

|  | Descriptor |
|---|---|
| picture_header_rbsp( ) { |  |
|     non_reference_picture_flag | u(1) |
|     gdr_pic_flag | u(1) |
|     no_output_of_prior_pics_flag | u(1) |
|     if( gdr_pic_flag ) |  |
|         recovery_poc_cnt | ue(v) |
|     ph_pic_parameter_set_id | ue(v) |
|     if( mixed_slice_types_in_pic_flag ) |  |
|         ph_mixed_slice_types_in_pic_flag | u(1) |
|         if( ph_mixed_slice_types_in_pic_flag ) |  |
|             ph_intra_slice_present_flag | u(1) |
|     else |  |
|         ph_slice_type | ue(v) |
|     ... |  |
|     if( partition_constraints_override_enabled_flag ) { |  |
|         partition_constraints_override_flag | u(1) |
|         if( partition_constraints_override_flag ) { |  |
|             if( InterSlicePresent ) { |  |
|                 pic_log2_diff_min_qt_min_cb_inter_slice | ue(v) |
|                 pic_max_mtt_hierarchy_depth_inter_slice | ue(v) |
|                 if( pic_max_mtt_hierarchy_depth_inter_slice = 0 ) { |  |
|                     pic_log2_diff_max_bt_min_qt_inter_slice | ue(v) |
|                     pic_log2_diff_max_tt_min_qt_inter_slice | ue(v) |
|                 } |  |
|             } |  |
|             if( IntraSlicePresent ) { |  |
|                 pic_log2_diff_min_qt_min_cb_intra_slice_luma | ue(v) |
|                 pic_max_mtt_hierarchy_depth_intra_slice_luma | ue(v) |
|                 if( pic_max_mtt_hierarchy_depth_intra_slice_luma = 0 ) { |  |
|                     pic_log2_diff_max_bt_min_qt_intra_slice_luma | ue(v) |
|                     pic_log2_diff_max_tt_min_qt_intra_slice_luma | ue(v) |
|                 } |  |
|                 if( qtbtt_dual_tree_intra_flag ) { |  |
|                     pic_log2_diff_min_qt_min_cb_intra_slice_chroma | ue(v) |
|                     pic_max_mtt_hierarchy_depth_intra_slice_chroma | ue(v) |
|                     if( pic_max_mtt_hierarchy_depth_intra_slice_chroma |  |
| = 0 ) { |  |
|                     pic_log2_diff_max_bt_min_qt_intra_slice_chroma | ue(v) |
|                         pic_log2_diff_max_tt_min_qt_intra_slice_chroma | ue(v) |
|                     } |  |
|                 } |  |
|             } |  |
|         } |  |
|     } |  |
|     ... |  |
|     if( cu_qp_delta_enabled_flag ) { |  |
|         if( IntraSlicePresent ) |  |
|             pic_cu_qp_delta_subdiv_intra_slice | ue(v) |
|         if( InterSlicePresent ) |  |
|             pic_cu_qp_delta_subdiv_inter_slice | ue(v) |
|     } |  |
|     if( pps_cu_chroma_qp_offset_list_enabled_flag ) { |  |

TABLE 12-continued

| | Descriptor |
|---|---|
|     if( IntraSlicePresent ) | |
|         pic_cu_chroma_qp_offset_subdiv_intra_slice | ue(v) |
|     if( InterSlicePresent ) | |
|         pic_cu_chroma_qp_offset_subdiv_inter_slice | ue(v) |
| } | |
| if( InterSlicePresent ) { | |
|     if( sps_temporal_mvp_enabled_flag ) | |
|         pic_temporal_mvp_enabled_flag | u(1) |
|     if(pps_mvd_l1_zero_idc) | |
|         mvd_l1_zero_flag | u(1) |
|     if( pps_six_minus_max_num_merge_cand_plus1 ) | |
|         pic_six_minus_max_num_merge_cand | ue(v) |
|     if( sps_affine_enabled_flag ) | |
|         pic_five_minus_max_num_subblock_merge_cand | ue(v) |
|     if( sps_fpel_mmvd_enabled_flag ) | |
|         pic_fpel_mmvd_enabled_flag | u(1) |
|     if( sps_bdof_pic_present_flag ) | |
|         pic_disable_bdof_flag | u(1) |
|     if( sps_dmvr_pic_present_flag ) | |
|         pic_disable_dmvr_flag | u(1) |
|     if( sps_prof_pic_present_flag ) | |
|         pic_disable_prof_flag | u(1) |
|     if( sps_triangle_enabled_flag && MaxNumMergeCand >= 2 && | |
| pps_max_num_merge_cand_minus_max_num_triangle_cand_plus1 ) | |
|         pic_max_num_merge_cand_minus_max_num_triangle_cand | ue(v) |
| } | |
| ... | |
|     rbsp_trailing_bits( ) | |
| } | |

TABLE 13

| | Descriptor |
|---|---|
| slice_header ( ) { | |
|     slice_pic_order_cnt_lsb | u(v) |
|     if( subpics_present_flag ) | |
|         slice_subpic_id | u(v) |
|     if( rect_slice_flag || NumTilesInPic > 1 ) | |
|         slice_address | u(v) |
|     if( rect_slice_flag && NumTilesInPic > 1 ) | |
|         num_tiles_in_slice_minus1 | ue(v) |
|     if( ph_mixed_slice_types_in_pic_flag ) { | |
|         if(IntraSlicePresent) | |
|             slice_type | ue(v) |
|         else | |
|             P_slice_flag | u(1) |
|     ... | |
| } | |

The value of ph_mixed_slice_types_in_pic_flag being 1 specifies that more than one slice type may be present in the current picture. The value of ph_mixed_slice_types_in_pic_flag being 0 specifies that all the slices in a current picture shall have the same value of slice_type. When ph_mixed_slice_types_in_pic_flag is not present, the value of ph_mixed_slice_types_in_pic_flag is inferred to be equal to 0.

The value of ph_intra_slice_present_flag being 1 indicates that the slice type I may be present in a current picture. The value of ph_intra_slice_present_flag being 0 specifies that the slice type I is not present in a current picture. The syntax element ph_slice_type specifies the value of slice_type in all the slice headers in the current picture when ph_mixed_slice_types_in_pic_flag is equal to 0.

The variables InterSlicePresent and IntraSlicePresent are derived as follows:

If ph_mixed_slice_types_in_pic_flag is equal to 1, InterSlicePresent is set equal to 1 and IntraSlicePresent is set equal to ph_intra_slice_present_flag Otherwise, InterSlicePresent is set equal to (ph_slice_type=I) and IntraSlicePresent is set equal to (ph_slice_type==I)

The syntax element slice_type specifies the coding type of the slice according to Table 23 below. When slice_type is not present, the value of slice_types is derived as follows:

If ph_mixed_slice_types_in_pic_flag is equal to 1, the value of slice_type is set equal to P_slice_flag.

Otherwise, the value of slice_type is set equal to ph_slice_type.

The syntax element P_slice_flag being 1 specifies that the value of slice_type is equal to P when ph_mixed_slice_types_in_pic_flag is equal to 1 and IntraSlicePresent is equal to 0. P_slice_flag equal to 0 specifies that the value of slice_type is equal to B when ph_mixed_slice_types_in_pic_flag is equal to 1 and IntraSlicePresent is equal to 0.

(d) Signaling for Presence of Individual Slice Types

In some embodiments, the video coder indicates whether each slice types (B, P, and I) may be present in a current picture. The syntax element ph_mixed_slice_types_in_pic_flag in a current picture header indicates whether more than one slice type may be present in a current picture. When ph_mixed_slice_types_in_pic_flag is equal to 1, a syntax element ph_present_slice_types is further signaled to indicate the slice types that may be present in a current picture. Specifically, the variables BSlicePresent, PSlicePresent and ISlicePresent indicate whether slice types B, P and I may be present in the current picture, respectively. The variables BSlicePresent, PSlicePresent and ISlicePresent can be derived from the values of ph_mixed_slice_types_in_pic_flag, ph_slice_type and ph_present_slice_types. In the slice header, the information on slice_type is signaled dependent on the values of ph_mixed_slice_types_in_pic_flag and ph_present_slice_types. Tables 14 and 15 below show a picture header and a slice header in which the syntax includes signaling for indicating whether each of the slice types may be present.

TABLE 14

| | Descriptor |
|---|---|
| picture_header_rbsp( ) { | |
|     non_reference_picture_flag | u(1) |
|     gdr_pic_flag | u(1) |
|     no_output_of_prior_pics_flag | u(1) |
|     if( gdr_pic_flag ) | |
|         recovery_poc_cnt | ue(v) |
|     ph_pic_parameter_set_id | ue(v) |
| if( mixed_slice_types_in_pic_flag ) | |
|     ph_mixed_slice_types_in_pic_flag | u(1) |
|     if( ph_mixed_slice_types_in_pic_flag ) | |
|         ph_present_slice_types | u(2) |
| else | |
|     ph_slice_type | ue(v) |
| ... | |
|     if( partition_constraints_override_enabled_flag ) { | |
|         partition_constraints_override_flag | u(1) |
|         if( partition_constraints_override_flag ) { | |
|             if( BSlicePresent \|\| PSlicePresent ) { | |
|                 pic_log2_diff_min_qt_min_cb_inter_slice | ue(v) |
|                 pic_max_mtt_hierarchy_depth_inter_slice | ue(v) |
|                 if( pic_max_mtt_hierarchy_depth_inter_slice = 0 ) { | |
|                     pic_log2_diff_max_bt_min_qt_inter_slice | ue(v) |
|                     pic_log2_diff_max_tt_min_qt_inter_slice | ue(v) |
|                 } | |
|             } | |
|             if( ISlicePresent) { | |
|                 pic_log2_diff_min_qt_min_cb_intra_slice_luma | ue(v) |
|                 pic_max_mtt_hierarchy_depth_intra_slice_luma | ue(v) |
|                 if( pic_max_mtt_hierarchy_depth_intra_slice_luma = 0 ) { | |
|                     pic_log2_diff_max_bt_min_qt_intra_slice_luma | ue(v) |
|                     pic_log2_diff_max_tt_min_qt_intra_slice_luma | ue(v) |
|                 } | |
|                 if( qtbtt_dual_tree_intra_flag ) { | |
|                     pic_log2_diff_min_qt_min_cb_intra_slice_chroma | ue(v) |
|                     pic_max_mtt_hierarchy_depth_intra_slice_chroma | ue(v) |
|                     if( pic_max_mtt_hierarchy_depth_intra_slice_chroma = 0 ) { | |
|     pic_log2_diff_max_bt_min_qt_intra_slice_chroma | ue(v) |
|     pic_log2_diff_max_tt_min_qt_intra_slice_chroma | ue(v) |
|                     } | |
|                 } | |
|             } | |
|         } | |
|     } | |
|     ... | |
|     if( cu_qp_delta_enabled_flag ) { | |
|         if( ISlicePresent ) | |
|             pic_cu_qp_delta_subdiv_intra_slice | ue(v) |
|         if( BSlicePresent \|\| PSlicePresent ) | |
|             pic_cu_qp_delta_subdiv_inter_slice | ue(v) |
|     } | |
|     if( pps_cu_chroma_qp_offset_list_enabled_flag ) { | |
|         if( ISlicePresent ) | |
|             pic_cu_chroma_qp_offset_subdiv_intra_slice | ue(v) |
|         if( BSlicePresent \|\| PSlicePresent ) | |
|             pic_cu_chroma_qp_offset_subdiv_inter_slice | ue(v) |
|     } | |
|     if( BSlicePresent \|\| PSlicePresent ) { | |
|         if( sps_temporal_mvp_enabled_flag ) | |
|             pic_temporal_mvp_enabled_flag | u(1) |
|         if(pps_mvd_l1_zero_idc && BSlicePresent ) | |
|             mvd_l1_zero_flag | u(1) |
|         if( pps_six_minus_max_num_merge_cand_plus1 ) | |
|             pic_six_minus_max_num_merge_cand | ue(v) |
|         if( sps_affine_enabled_flag ) | |
|             pic_five_minus_max_num_subblock_merge_cand | ue(v) |
|         if( sps_fpel_mmvd_enabled_flag ) | |
|             pic_fpel_mmvd_enabled_flag | u(1) |
|         if( sps_bdof_pic_present_flag && BSlicePresent ) | |
|             pic_disable_bdof_flag | u(1) |
|         if( sps_dmvr_pic_present_flag && BSlicePresent ) | |
|             pic_disable_dmvr_flag | u(1) |
|         if( sps_prof_pic_present_flag ) | |
|             pic_disable_prof_flag | u(1) |
|         if( sps_triangle_enabled_flag && MaxNumMergeCand >= 2 && | |
|     pps_max_num_merge_cand_minus_max_num_triangle_cand_plus1 | |
| ) | |

TABLE 14-continued

| | Descriptor |
|---|---|
| pic_max_num_merge_cand_minus_max_num_triangle_cand<br>}<br>...<br>    rbsp_trailing_bits( )<br>} | ue(v) |

TABLE 15

| | Descriptor |
|---|---|
| slice_header ( ) {<br>    slice_pic_order_cnt_lsb | u(v) |
|     if( subpics_present_flag ) | |
|         slice_subpic_id | u(v) |
|     if( rect_slice_flag \|\| NumTilesInPic > 1 ) | |
|         slice_address | u(v) |
|     if( rect_slice_flag && NumTilesInPic > 1 ) | |
|         num_tiles_in_slice_minus1 | ue(v) |
|     if( ph_mixed_slice_types_in_pic_flag ) { | |
|         if( ph_present_slice_types= = 3 ) | |
|             slice_type | ue(v) |
|         else | |
|             slice_type_flag | u(1) |
|     ...<br>} | |

The value of ph_mixed_slice_types_in_pic_flag being equal to 1 specifies that more than one slice type may be present in the current picture. The value of ph_mixed_slice_types_in_pic_flag being equal to 0 specifies that all the slices in a current picture shall have the same value of slice_type. When ph_mixed_slice_types_in_pic_flag is not present, the value of ph_mixed_slice_types_in_pic_flag is inferred to be equal to 0.

The syntax element ph_present_slice_types specifies the slice types that may be present in a current picture when ph_mixed_slice_types_in_pic_flag is equal to 1. The syntax element ph_slice_type specifies the value of slice_type in all the slice headers in the current picture when ph_mixed_slice_types_in_pic_flag is equal to 0.

The variables BSlicePresent, PSlicePresent and ISlicePresent are derived as follows:

If ph_mixed_slice_types_in_pic_flag is equal to 1, BSlicePresent is set equal to (ph_slice_type==B), PSlicePresent is set equal to (ph_slice_type==P) and ISlicePresent is set equal to (ph_slice_type==I)

Otherwise, BSlicePresent is set equal to (ph_present_slice_types=0), PSlicePresent is set equal to (ph_present_slice_types=1) and ISlicePresent is set equal to (ph_present_slice_types=2)

The syntax element slice_type specifies the coding type of the slice according to Table 23 below. When the syntax element slice_type is not present, its value is derived as follows:

If ph_mixed_slice_types_in_pic_flag is equal to 1, the value of slice_type is set equal to (slice_type_flag>=ph_present_slice_types?slice_type_flag+1: slice_type_flag).

Otherwise, the value of slice_type is set equal to ph_slice_type.

The syntax element slice_type_flag specifies the value of slice_type when ph_mixed_slice_types_in_pic_flag when ph_mixed_slice_types_in_pic_flag is equal to 1 and the value of ph_present_slice_types is not equal to 3.

In some embodiments, syntax elements ph_inter_slice_allowed_flag and ph_intra_slice_allowed_flag are signaled to indicate whether inter slices and intra slices are allowed to be present in the picture, respectively. When ph_inter_slice_allowed_flag is equal to 0, syntax elements that are related to only intra coding tools are not signaled. When ph_intra_slice_allowed_flag is equal to 0, syntax elements related to only inter coding tools are not signaled. When ph_inter_slice_allowed_flag is equal to 0, the value of the syntax element slice_type in the slice header is inferred to be equal to 2 and is not coded in the bitstream.

(e) Signaling if Inter Slice and Intra Slice May Be Present

In some embodiments, the video coder signals information for deriving whether the inter slice type (B or P) and the intra slice type (I) may be present in the coded picture, respectively. In some embodiments, a syntax element ph_multiple_slice_types_in_pic_flag is further added to the picture header to indicate whether more than one slice type may be present in coded slices of the picture. The value of ph_multiple_slice_types_in_pic_flag equal to 1 specifies that coded slices of the picture may have different values of slice_type. The value of ph_multiple_slice_types_in_pic_flag equal to 0 specifies that all coded slices of the picture have the same value of slice_type. When ph_multiple_slice_types_in_pic_flag is equal to 1, a syntax element ph_intra_slice_allowed_flag is further signaled to indicate whether the slice type I is allowed in the current picture. When ph_multiple_slice_types_in_pic_flag is equal to 0, a syntax element ph_slice_type is further signaled to specify the value of slice_type for all slices of the picture. The variables InterSliceAllowed and IntraSliceAllowed, respectively indicates whether the inter slice type (slice type B or P) and the intra slice type (slice type I) are allowed in the picture. The values of the variables InterSliceAllowed and IntraSliceAllowed can be derived from the values of ph_multiple_slice_types_in_pic_flag, ph_intra_slice_allowed_flag and ph_slice_type. The values of the PH syntax elements related to the coding tools that are only applied to the unused slice types are not coded. When no_pic_partition_flag is equal to 1 or rect_slice_flag is equal to 1 and num_slices_in_pic_minus1 is equal to 1, ph_multiple_slice_types_in_pic_flag is inferred to be equal to 0 and is not explicitly coded in the bitstream. Alternatively, a new syntax element pps_multiple_slice_types_in_pic_flag can be further signaled in the PPS to indicate whether more than one slice type may be present in each picture referring to the PPS. When pps_multiple_slice_types_in_pic_flag is equal to 0, ph_multiple_slice_types_in_pic_flag is inferred to be equal to 0 and is not coded in the bitstream. Tables 16 and 17 below show a picture header and a slice header in which the syntax includes signaling for indicating whether inter slice and intra slice are present.

TABLE 16

|  | Descriptor |
|---|---|
| picture_header_structure( ) { | |
|     gdr_or_irap_pic_flag | u(1) |
|     if( gdr_or_irap_pic_flag ) | |
|         gdr_pic_flag | u(1) |
|     if( no_pic_partition_flag && | |
|         ( rect_slice_flag && num_slices_in_pic_minus1 = = 0 ) ) | |
|     ph_multiple_slice_types_in_pic_flag | u(1) |
|     if(ph_multiple_slice_types_in_pic_flag ) | |
|         ph_intra_slice_allowed_flag | u(1) |
|     else | |
|         ph_slice_type | ue(v) |
|     non_reference_picture_flag | u(1) |
|     ph_pic_parameter_set_id | ue(v) |
|     ..... | |
|     if( partition_constraints_override_enabled_flag ) | |
|         partition_constraints_override_flag | u(1) |
|     if( IntraSliceAllowed ) { | |
|         if( partition_constraints_override_flag ) { | |
|             ph_log2_diff_min_qt_min_cb_intra_slice_luma | ue(v) |
|             ph_max_mtt_hierarchy_depth_intra_slice_luma | ue(v) |
|             if( ph_max_mtt_hierarchy_depth_intra_slice_luma = 0 ) { | |
|                 ph_log2_diff_max_bt_min_qt_intra_slice_luma | ue(v) |
|                 ph_log2_diff_max_tt_min_qt_intra_slice_luma | ue(v) |
|             } | |
|             if( qtbtt_dual_tree_intra_flag ) { | |
|                 ph_log2_diff_min_qt_min_cb_intra_slice_chroma | ue(v) |
|                 ph_max_mtt_hierarchy_depth_intra_slice_chroma | ue(v) |
|                 if( ph_max_mtt_hierarchy_depth_intra_slice_chroma = 0 ) | |
| { | |
|                     ph_log2_diff_max_bt_min_qt_intra_slice_chroma | ue(v) |
|                     ph_log2_diff_max_tt_min_qt_intra_slice_chroma | ue(v) |
|                 } | |
|             } | |
|         } | |
|         if( cu_qp_delta_enabled_flag ) | |
|             ph_cu_qp_delta_subdiv_intra_slice | ue(v) |
|         if( pps_cu_chroma_qp_offset_list_enabled_flag ) | |
|             ph_cu_chroma_qp_offset_subdiv_intra_slice | ue(v) |
|     } | |
|     if( InterSliceAllowed ) { | |
|         if( partition_constraints_override_flag ) { | |
|             ph_log2_diff_min_qt_min_cb_inter_slice | ue(v) |
|             ph_max_mtt_hierarchy_depth_inter_slice | ue(v) |
|             if( ph_max_mtt_hierarchy_depth_inter_slice = 0 ) { | |
|                 ph_log2_diff_max_bt_min_qt_inter_slice | ue(v) |
|                 ph_log2_diff_max_tt_min_qt_inter_slice | ue(v) |
|             } | |
|         } | |
|         if( cu_qp_delta_enabled_flag ) | |
|             ph_cu_qp_delta_subdiv_inter_slice | ue(v) |
|         if( pps_cu_chroma_qp_offset_list_enabled_flag ) | |
|             ph_cu_chroma_qp_offset_subdiv_inter_slice | ue(v) |
|         if( sps_temporal_mvp_enabled_flag ) { | |
|             ph_temporal_mvp_enabled_flag | u(1) |
|             if( ph_temporal_mvp_enabled_flag && rpl_info_in_ph_flag ) | |
| { | |
|                 ph_collocated_from_l0_flag | u(1) |
|                 if( ( ph_collocated_from_l0_flag && | |
|                     num_ref_entries[ 0 ][ RplsIdx[ 0 ] ] > 1 ) | | | |
|                   ( ph_collocated_from_l0_flag && | |
|                     num_ref_entries[ 1 ][ RplsIdx[ 1 ] ] > 1 ) ) | |
|                     ph_collocated_ref_idx | ue(v) |
|                 } | |
|             } | |
|         mvd_l1_zero_flag | u(1) |
|         if( sps_fpel_mmvd_enabled_flag ) | |
|             ph_fpel_mmvd_enabled_flag | u(1) |
|         if( sps_bdof_pic_present_flag ) | |
|             ph_disable_bdof_flag | u(1) |
|         if( sps_dmvr_pic_present_flag ) | |
|             ph_disable_dmvr_flag | u(1) |
|         if( sps_prof_pic_present_flag ) | |
|             ph_disable_prof_flag | u(1) |

TABLE 16-continued

| | Descriptor |
|---|---|
|     if( ( pps_weighted_pred_flag \|\| pps_weighted_bipred_flag ) && wp_info_in_ph_flag ) | |
|         pred_weight_table( ) | |
|     } | |
|   ..... | |
| } | |

TABLE 17

| | Descriptor |
|---|---|
| slice_header( ) { | |
|     picture_header_in_slice_header_flag | u(1) |
|     if( picture_header_in_slice_header_flag ) | |
|         picture_header_structure( ) | |
|     if( subpic_info_present_flag ) | |
|         slice_subpic_id | u(v) |
|     if( ( rect_slice_flag && NumSlicesInSubpic[ CurrSubpicIdx ] > 1 ) \|\| | |
|         ( rect_slice_flag && NumTilesInPic > 1 ) ) | |
|         slice_address | u(v) |
|     for( i = 0; i < NumExtraShBits; i++ ) | |
|         sh_extra_bit[ i ] | u(1) |
|     if( rect_slice_flag && NumTilesInPic > 1 ) | |
|         num_tiles_in_slice_minus1 | ue(v) |
|     if( ph_multiple_slice_types_in_pic_flag ) | |
|         if( IntraSliceAllowed ) | |
|             slice_type | ue(v) |
|         else | |
|             P_slice_flag | u(1) |
|   ..... | |
| } | |

The value of ph_multiple_slice_types_in_pic_flag being 1 specifies that coded slices of the picture may have different values of slice_type. ph_multiple_slice_types_in_pic_flag equal to 0 specifies that all coded slices of the picture have the same value of slice_type. When ph_multiple_slice_types_in_pic_flag is not present, it is inferred to be being 0.

The value of ph_intra_slice_allowed_flag being equal to 0 specifies that all coded slices of the picture have slice_type equal to 0 or 1. The value of ph_intra_slice_allowed_flag equal to 1 specifies that there may or may not be one or more coded slices in the picture that have slice_type equal to 2. The syntax element ph_slice_type specifies the value of slice_type for all slice in the picture when ph_multiple_slice_types_in_pic_flag is equal to 0.

The variables InterSliceAllowed and IntraSliceAllowed are derived as follows:

If ph_multiple_slice_types_in_pic_flag is equal to 1, InterSliceAllowed is set equal to 1 and IntraSliceAllowed is set equal to ph_intra_slice_present_flag Otherwise, InterSliceAllowed is set equal to (ph_slice_type=I) and IntraSliceAllowed is set equal to (ph_slice_type==I)

In some embodiments, for bitstreams that supports sub-picture-based bitstream merging without the need of changing PH NAL units, the encoder sets the values of both InterSliceAllowed and IntraSliceAllowed to 1.

(f) Signaling if Each of Slice Types May Be Present

In some embodiments, the video coder signals information for deriving whether each of slice types (B, P, and I) may be present in the coded picture. In some embodiments, a syntax element ph_multiple_slice_types_in_pic_flag is further added to the picture header to indicate whether more than one slice type may be present in coded slices of the picture. The syntax element ph_multiple_slice_types_in_pic_flag being equal to 1 indicates that coded slices of the picture may have different values of slice_type. The syntax element ph_multiple_slice_types_in_pic_flag being equal to 0 indicates that all coded slices of the picture have the same value of slice_type.

When ph_multiple_slice_types_in_pic_flag is equal to 1, a syntax element ph_allowed_slice_types_idc is further signaled for deriving the allowed slice types for slices of the picture. When ph_multiple_slice_types_in_pic_flag is equal to 0, a syntax element ph_slice_type is further signaled to specifiy the value of slice_type for all slices of the picture. The values of the variables BSliceAllowed, PSliceAllowed and ISliceAllowed, respectively indicate whether slice types B, P, and I are allowed in the picture. The variables BSliceAllowed, PSliceAllowed and ISliceAllowed can be derived from the values of ph_multiple_slice_types_in_pic_flag, ph_allowed_slice_types_idc and ph_slice_type. The values of the PH syntax elements related to the coding tools that are only applied to the unused slice types are not coded. When no_pic_partition_flag is equal to 1 or rect_slice_flag is equal to 1 and num_slices_in_pic_minus1 is equal to 1, ph_multiple_slice_types_in_pic_flag is inferred to be equal to 0 and is not explicitly coded in the bitstream.

Alternatively, a syntax element pps_multiple_slice_types_in_pic_flag can be further signaled in the PPS to indicate whether more than one slice type may be present in each picture referring to the PPS. When the value of pps_multiple_slice_types_in_pic_flag is equal to 0, the syntax element ph_multiple_slice_types_in_pic_flag is inferred to be equal to 0 and is not coded in the bitstream. Tables 18 and 19 below show a picture header and a slice header in which the syntax includes signaling for indicating whether each of slice types may be present.

TABLE 18

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   if( no_pic_partition_flag && | |
|     ( rect_slice_flag && num_slices_in_pic_minus1 = = 0 ) ) | |
|   ph_multiple_slice_types_in_pic_flag | u(1) |
|   if(ph_multiple_slice_types_in_pic_flag ) | |
|     ph_allowed_slice_types_idc | u(2) |
|   else | |
|     ph_slice_type | ue(v) |
|   non_reference_picture_flag | u(1) |
|   ph_pic_parameter_set_id | ue(v) |
|   ..... | |
|   if( partition_constraints_override_enabled_flag ) | |
|     partition_constraints_override_flag | u(1) |
|   if(ISliceAllowed ) { | |
|     if( partition_constraints_override_flag ) { | |
|       ph_log2_diff_min_qt_min_cb_intra_slice_luma | ue(v) |
|       ph_max_mtt_hierarchy_depth_intra_slice_luma | ue(v) |
|       if( ph_max_mtt_hierarchy_depth_mtra_slice_luma = 0 ) { | |
|         ph_log2_diff_max_bt_min_qt_intra_slice_luma | ue(v) |
|         ph_log2_diff_max_tt_min_qt_intra_slice_luma | ue(v) |
|       } | |
|       if( qtbtt_dual_tree_intra_flag ) { | |
|         ph_log2_diff_min_qt_min_cb_intra_slice_chroma | ue(v) |
|         ph_max_mtt_hierarchy_depth_intra_slice_chroma | ue(v) |
|         if( ph_max_mtt_hierarchy_depth_intra_slice_chroma = 0 ) { | |
|           ph_log2_diff_max_bt_min_qt_intra_slice_chroma | ue(v) |
|           ph_log2_diff_max_tt_min_qt_intra_slice_chroma | ue(v) |
|         } | |
|       } | |
|     } | |
|     if( cu_qp_delta_enabled_flag ) | |
|       ph_cu_qp_delta_subdiv_intra_slice | ue(v) |
|     if( pps_cu_chroma_qp_offset_list_enabled_flag ) | |
|       ph_cu_chroma_qp_offset_subdiv_intra_slice | ue(v) |
|   } | |
|   if(BSliceAllowed \|\| PSliceAllowed ) { | |
|     if( partition_constraints_override_flag ) { | |
|       ph_log2_diff_min_qt_min_cb_inter_slice | ue(v) |
|       ph_max_mtt_hierarchy_depth_inter_slice | ue(v) |
|       if( ph_max_mtt_hierarchy_depth_inter_slice = 0 ) { | |
|         ph_log2_diff_max_bt_min_qt_inter_slice | ue(v) |
|         ph_log2_diff_max_tt_min_qt_inter_slice | ue(v) |
|       } | |
|     } | |
|     if( cu_qp_delta_enabled_flag ) | |
|       ph_cu_qp_delta_subdiv_inter_slice | ue(v) |
|     if( pps_cu_chroma_qp_offset_list_enabled_flag ) | |
|       ph_cu_chroma_qp_offset_subdiv_inter_slice | ue(v) |
|     if( sps_temporal_mvp_enabled_flag ) { | |
|       ph_temporal_mvp_enabled_flag | u(1) |
|       if( ph_temporal_mvp_enabled_flag && rpl_mfo_in_ph_flag ) { | |
|         if( BSliceAllowed ) | |
|           ph_collocated_from_l0_flag | u(1) |
|         if( ( ph_collocated_from_l0_flag && | |
|           num_ref_entries[ 0 ][ RplsIdx[ 0 ] ] > 1 ) \|\| | |
|           ( ph_collocated_from_l0_flag && | |
|           num_ref_entries[ 1 ][ RplsIdx[ 1 ] ] > 1 ) ) | |
|           ph_collocated_ref_idx | ue(v) |
|       } | |
|     } | |
|     if( BSliceAllowed ) | |
|       mvd_l1_zero_flag | u(1) |
|     if( sps_fpel_mmvd_enabled_flag ) | |
|       ph_fpel_mmvd_enabled_flag | u(1) |
|     if( sps_bdof_pic_present_flag && BSliceAllowed ) | |
|       ph_disable_bdof_flag | u(1) |
|     if( sps_dmvr_pic_present_flag && BSliceAllowed ) | |
|       ph_disable_dmvr_flag | u(1) |
|     if( sps_prof_pic_present_flag ) | |
|       ph_disable_prof_flag | u(1) |

TABLE 18-continued

| | Descriptor |
|---|---|
|     if( (( pps_weighted_pred_flag && PSliceAllowed ) \|\| <br>( pps_weighted_bipred_flag && BSliceAllowed )) && <br>wp_info_in_ph_flag ) <br>        pred_weight_table( ) <br>    } <br>  ..... <br>} | |

TABLE 19

| | Descriptor |
|---|---|
| slice_header( ) { | |
|     picture_header_in_slice_header_flag | u(1) |
|     if( picture_header_in_slice_header_flag ) | |
|         picture_header_structure( ) | |
|     if( subpic_info_present_flag ) | |
|         slice_subpic_id | u(v) |
|     if( ( rect_slice_flag && NumSlicesInSubpic[ CurrSubpicIdx ] > 1 ) \|\| <br>        ( rect_slice_flag && NumTilesInPic > 1 ) ) | |
|         slice_address | u(v) |
|     for( i = 0; i < NumExtraShBits; i++ ) | |
|         sh_extra_bit[ i ] | u(1) |
|     if( rect_slice_flag && NumTilesInPic > 1 ) | |
|         num_tiles_in_slice_minus1 | ue(v) |
|     if( ph_multiple_slice_types_in_pic_flag ) | |
|         if( ph_allowed_slice_types_idc = = 3 ) | |
|             slice_type | ue(v) |
|         else | |
|             slice_type_flag | u(1) |
|   ..... | |
| } | |

The syntax element pred_weight_Table is provided by syntax table shown in Table 20 below.

TABLE 20

| | Descriptor |
|---|---|
| pred_weight_table( ) { | |
|     luma_log2_weight_denom | ue(v) |
|     if( ChromaArrayType = 0 ) | |
|         delta_chroma_log2_weight_denom | se(v) |
|     if( wp_info_in_ph_flag ) | |
|         num_l0_weights | ue(v) |
|     for( i = 0; i < NumWeightsL0; i++ ) | |
|         luma_weight_l0_flag[ i ] | u(1) |
|     if( ChromaArrayType = 0 ) | |
|         for( i = 0; i < NumWeightsL0; i++ ) | |
|             chroma_weight_l0_flag[ i ] | u(1) |
|     for( i = 0; i < NumWeightsL0; i++ ) { | |
|         if( luma_weight_l0_flag[ i ] ) { | |
|             delta_luma_weight_l0[ i ] | se(v) |
|             luma_offset_l0[ i ] | se(v) |
|         } | |
|         if( chroma_weight_l0_flag[ i ] ) | |
|             for( j = 0; j < 2; j++ ) { | |
|                 delta_chroma_weight_l0[ i ][ j ] | se(v) |
|                 delta_chroma_offset_l0[ i ][ j ] | se(v) |
|             } | |
|     } | |
|     if( pps_weighted_bipred_flag && ( wp_info_in_ph_flag && <br>BSliceAllowed ) ) | |
|         num_l1_weights | ue(v) |
|     for( i = 0; i < NumWeightsL1; i++ ) | |
|         luma_weight_l1_flag[ i ] | u(1) |
|     if( ChromaArrayType = 0 ) | |
|         for( i = 0; i < NumWeightsL1; i++ ) | |
|             chroma_weight_l1_flag[ i ] | u(1) |
|     for( i = 0; i < NumWeightsL1; i++ ) { | |

TABLE 20-continued

|  | Descriptor |
|---|---|
|       if( luma_weight_l1_flag[ i ] ) { | |
|           delta_luma_weight_l1[ i ] | se(v) |
|           luma_offset_l1[ i ] | se(v) |
|       } | |
|       if( chroma_weight_l1_flag[ i ] ) | |
|           for( j = 0; j < 2; j++ ) { | |
|               delta_chroma_weight_l1[ i ][ j ] | se(v) |
|               delta_chroma_offset_l1[ i ][ j ] | se(v) |
|           } | |
|     } | |
| } | |

The syntax element num_l1_weights specifies the number of weights signaled for entries in reference picture list 1 when pps_weighted_bipred_flag and wp_info_in_ph_flag are both equal to 1. The value of num_l1_weights is constrained to be in the range of 0 to Min(15, num_ref_entries[1][RplsIdx[1]]), inclusive. The variable NumWeightsL1 is derived as follows:

```
if ( pps_weighted_bipred_flag )
    NumWeightsL1 = 0
else if( wp_info_in_ph_flag )
    NumWeightsL1 = BSliceAllowed ? num_l1_weights : 0
else NumWeightsL1 = NumRefIdxActive[ 1 ]
```

In the picture header as shown in Table 18 above, the syntax element ph_multiple_slice_types_in_pic_flag being equal to 1 indicates that coded slices of the picture may have different values of slice_type. The value of ph_multiple_slice_types_in_pic_flag being equal to 0 specifies that all coded slices of the picture have the same value of slice_type. When the syntax element ph_multiple_slice_types_in_pic_flag is not present, its value is inferred to be equal to 0. When ph_multiple_slice_types_in_pic_flag is equal to 1, the syntax element ph_allowed_slice_types_idc specifies the allowed values of slice_type for coded slices in the picture. Table 21 below shows the allowed slice_type as specified by ph_allowed_slice_types_idc. (The coding types of the slice are specified by slice_type according to Table 23 below.)

TABLE 21

| ph_allowed_slice_types_idc | allowed values of slice types |
|---|---|
| 0 | 1, 2 (P, I) |
| 1 | 0, 2 (B, I) |
| 2 | 0, 1 (B, P) |
| 3 | 0, 1, 2 (B, P, I) |

The syntax element ph_slice_type specifies the value of slice_type for all slice headers in the picture when ph_muliple_slice_types_in_pic_flag is equal to 0. The variables BSliceAllowed, PSliceAllowed and ISliceAllowed are derived as follows:

If ph_multiple_slice_types_in_pic_flag is equal to 0, BSliceAllowed is set equal to (ph_slice_type==B), PSliceAllowed is set equal to (ph_slice_type==P) and ISliceAllowed is set equal to (ph_slice_type==I)

Otherwise, BSliceAllowed is set equal to (ph_allowed_slice_types_idc=0), PSliceAllowed is set equal to (ph_allowed_slice_types_idc=1) and ISliceAllowed is set equal to (ph_allowed_slice_types_idc=2)

In some embodiments, for bitstreams that support subpicure-based bitstream merging without the need of changing PH NAL units, the encoder sets the values of both ph_inter_slice_allowed_flag and ph_intra_slice_allowed_flag to equal to 1.

(g) Signaling the Slice Type Conditioned on PH Information

In some embodiments, when ph_inter_slice_allowed_flag is equal to 1 and ph_intra_slice_allowed is equal to 0, the value of slice_type is only allowed to be equal to either 0 or 1, and can be signaled by a syntax flag signaled by one bin. In some embodiments, the video coder signals information for deriving the value of slice_type in the slice header, conditioned upon the values of ph_inter_slice_allowed_flag is equal to 1 and ph_intra_slice_allowed in the PH. In some embodiments, the syntax element P_slice_flag specifies whether the value of slice_type is equal to 0 or 1 when ph_inter_slice_allowed_flag is equal to 1 and ph_intra_slice_allowed is equal to 0. As such, a bitsream with ph_intra_slice_allowed equal to 0 and slice_type equal to 2 can be avoided. Table 22 below shows a slice header that signals slice type conditioned on PH information:

TABLE 22

|  | Descriptor |
|---|---|
| slice_header( ) { | |
|     picture_header_in_slice_header_flag | u(1) |
|     if( picture_header_in_slice_header_flag ) | |
|         picture_header_structure( ) | |
|     if( subpic_info_present_flag ) | |
|         slice_subpic_id | u(v) |
|     if( ( rect_slice_flag && NumSlicesInSubpic[ CurrSubpicIdx ] > 1 ) \|\| | |
|         ( rect_slice_flag && NumTilesInPic > 1 ) ) | |
|         slice_address | u(v) |
|     for( i = 0; i < NumExtraShBits; i++ ) | |
|         sh_extra_bit[ i ] | u(1) |
|     if( rect_slice_flag && NumTilesInPic > 1 ) | |

TABLE 22-continued

| | Descriptor |
|---|---|
| num_tiles_in_slice_minus1 | ue(v) |
| if( ph_inter_slice_allowed_flag ) | |
| if( ph_intra_slice_allowed ) | |
| slice_type | ue(v) |
| else | |
| P_slice_flag | u(1) |
| ..... | |
| } | |

(h) Slice Header Semantics

TABLE 23

| slice_type | Name of slice_type |
|---|---|
| 0 | B (B slice) |
| 1 | P (P slice) |
| 2 | I (I slice) |

In some embodiments, when not present, the value of slice_type is inferred to be equal to ph_slice_type if ph_multiple_slice_types_in_pic_flag is equal to 0 and inferred to be equal to the value of P_slice_flag otherwise. P_slice_flag being equal to 1 specifies that the value of slice_type is equal to P when ph_multiple_slice_types_in_pic_flag is equal to 1 and IntraSliceAllowed is equal to 0. P_slice_flag being equal to 0 specifies that the value of slice_type is equal to B when ph_multiple_slice_types_in_pic_flag is equal to 1 and IntraSliceAllowed is equal to 0.

In some embodiments, when not present, the value of slice_type is inferred to be equal to 2 when ph_inter_slice_allowed_flag is equal to 0 and inferred to be equal to P_slice_flag otherwise. P_slice_flag being equal to 1 specifies that the value of slice_type is equal to P when ph_inter_slice_allowed_flag is equal to 1 and ph_intra_slice_allowed is equal to 0. P_slice_flag being equal to 0 specifies that the value of slice_type is equal to B when ph_inter_slice_allowed_flag is equal to 1 and ph_intra_slice_allowed is equal to 0.

In some embodiments, when not present, the value of slice_type is determined according to the following:

If ph_multiple_slice_types_in_pic_flag is equal to 1, the value of slice_type is set equal to (slice_type_flag>=ph_allowed_slice_types_idc?slice_type_flag+1: slice_type_flag).

Otherwise, the value of slice_type is set equal to ph_slice_type.

The syntax element slice_type_flag specifies the value of slice_type when ph_multiple_slice_types_in_pic_flag is equal to 1 and the value of ph_allowed_slice_types_idc is not equal to 3.

In some embodiments, when nal_unit_type is in the range of IDR_W RADL to CRA_NUT, inclusive, and vps_independent_layer_flag [GeneralLayerIdx[nuh_layer_id] ] is equal to 1, slice_type is constrained to be equal to 2.

FIG. 1 conceptually illustrates a portion of a coded video 100 in which syntax elements in picture headers and PPSs are used to indicate whether certain type or types of slices are present in the corresponding pictures. As illustrated, the coded video 100 includes picture 111-114. These pictures refer to a picture parameter set (PPS) 105. The coded video 100 includes picture headers 121-124 that are associated with the video pictures 111-114, respectively. Each of the video pictures 111-114 includes one or more slices, and each of the slices has a corresponding slice header. For example, the slices of the video picture 114 are associated with slice headers 151-154.

As illustrated, the picture header 124 for the picture 114 signals one or more slice information syntax elements that indicate presence of one or more the types of slices that are present in the current picture. In some embodiments, such slice information syntax elements may include ph_mixed_slice_types_in_pic_flag, and ph_intra_slice_present_flag (as shown in FIG. 1 and Table 12 above). In some embodiments, such slice information syntax elements may include ph_slice_B_present_flag, ph_slice_P_present_flag, ph_slice_I_present_flag (as shown in e.g., Table 7 above). Such a slice information syntax element may indicate whether a particular types of slice (inter, intra, B, P, or I) is present in the current picture.

Furthermore, the slice information syntax elements include syntax elements that indicate (i) whether a first type of slice is present in the current picture and (ii) whether a second, different type of slice is present in the current picture. A slice of the first type of slices (e.g., intra slices, I slice type) does not refer to information in pictures other than the current picture. A slice of the second type of slices (inter slices, B or P slice types) refers to information in pictures other than the current picture. For example, the slice information syntax element ph_mixed_slice_type_in_pic_flag and ph_intra_slice_present_flag can be used to determine whether intra slices and/or inter slices are allowed in the video picture 114 (by determining variables IntraSliceAllowed and InterSliceAllowed).

The video coder may bypass encoding or decoding picture header syntax elements that are not associated with the one or more types of slices present in the current picture that are identified by the one or more slice information syntax elements. For example, syntax elements 160 in the picture header 124 are skipped or bypassed if IntraSliceAllowed is false, and syntax element 162 in the picture header 140 are skipped or bypassed if InterSliceAllowed is false.

In some embodiments, the slice information syntax elements of a picture header include a multi-slice-type syntax element that indicates whether the current picture includes slices of more than one slice types. A slice header of a slice of the current picture signal or indicate a slice type when the multi-slice-type syntax element indicates that the current picture includes slices of more than one slice types. In the picture header 124, the syntax element ph_mixed_slice_types_in_pic_flag is a multi-slice-type syntax element that indicates that there can be a mix of different slices of different slice types in the picture (such that one slice in picture 114 can be I-slice while another slice can be B-slice, etc.). In the slice header 153, the multi-slice-type syntax element ph_mixed_slice_types_in_pic_flag is used to determine whether the syntax element "slice_type" is signaled.

The PPS 105 includes a PPS syntax element that indicates whether slices of different slice types are allowed (e.g., pps_mixed_slice_types_in_pic_flag). The picture header 140 signals the multi-slice-type syntax element ph_mixed_slice_types_in_pic_flag when the PPS syntax element indicates that slices of more than one slice types are allowed.

Any of the foregoing proposed methods can be implemented in encoders and/or decoders. For example, any of the proposed methods can be implemented in a high-level syntax encoding module an encoder, and/or a high-level syntax decoding module of a decoder. Alternatively, any of the proposed methods can be implemented as a circuit integrated to the high-level syntax encoding module of the encoder and/or the high-level syntax decoding module of the decoder. Any of the foregoing proposed methods can also be implemented in image encoders and/or decoders, wherein the resulting bitstream corresponds to one coded frame only using intra-picture prediction.

II. Example Video Encoder

Figure 2:
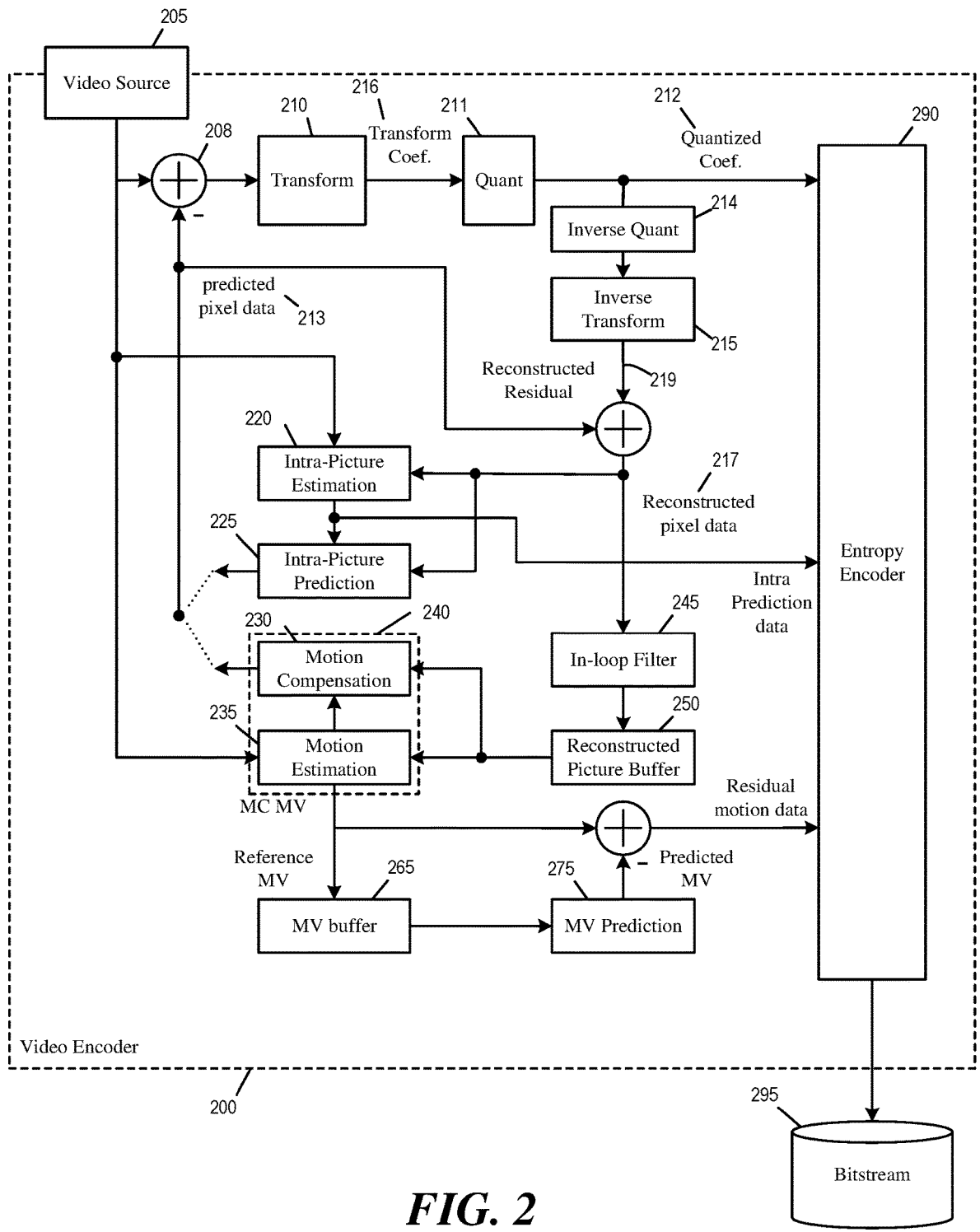
FIG. 2 illustrates an example video encoder.

FIG. 2 illustrates an example video encoder 200. As illustrated, the video encoder 200 receives input video signal from a video source 205 and encodes the signal into bitstream 295. The video encoder 200 has several components or modules for encoding the signal from the video source 205, at least including some components selected from a transform module 210, a quantization module 211, an inverse quantization module 214, an inverse transform module 215, an intra-picture estimation module 220, an intra-prediction module 225, a motion compensation module 230, a motion estimation module 235, an in-loop filter 245, a reconstructed picture buffer 250, a MV buffer 265, and a MV prediction module 275, and an entropy encoder 290. The motion compensation module 230 and the motion estimation module 235 are part of an inter-prediction module 240.

In some embodiments, the modules 210-290 are modules of software instructions being executed by one or more processing units (e.g., a processor) of a computing device or electronic apparatus. In some embodiments, the modules 210-290 are modules of hardware circuits implemented by one or more integrated circuits (ICs) of an electronic apparatus. Though the modules 210-290 are illustrated as being separate modules, some of the modules can be combined into a single module.

The video source 205 provides a raw video signal that presents pixel data of each video frame without compression. A subtractor 208 computes the difference between the raw video pixel data of the video source 205 and the predicted pixel data 213 from the motion compensation module 230 or intra-prediction module 225. The transform module 210 converts the difference (or the residual pixel data or residual signal 209) into transform coefficients (e.g., by performing Discrete Cosine Transform, or DCT). The quantization module 211 quantizes the transform coefficients into quantized data (or quantized coefficients) 212, which is encoded into the bitstream 295 by the entropy encoder 290.

The inverse quantization module 214 de-quantizes the quantized data (or quantized coefficients) 212 to obtain transform coefficients, and the inverse transform module 215 performs inverse transform on the transform coefficients to produce reconstructed residual 219. The reconstructed residual 219 is added with the predicted pixel data 213 to produce reconstructed pixel data 217. In some embodiments, the reconstructed pixel data 217 is temporarily stored in a line buffer (not illustrated) for intra-picture prediction and spatial MV prediction. The reconstructed pixels are filtered by the in-loop filter 245 and stored in the reconstructed picture buffer 250. In some embodiments, the reconstructed picture buffer 250 is a storage external to the video encoder 200. In some embodiments, the reconstructed picture buffer 250 is a storage internal to the video encoder 200.

The intra-picture estimation module 220 performs intra-prediction based on the reconstructed pixel data 217 to produce intra prediction data. The intra-prediction data is provided to the entropy encoder 290 to be encoded into bitstream 295. The intra-prediction data is also used by the intra-prediction module 225 to produce the predicted pixel data 213.

The motion estimation module 235 performs inter-prediction by producing MVs to reference pixel data of previously decoded frames stored in the reconstructed picture buffer 250. These MVs are provided to the motion compensation module 230 to produce predicted pixel data.

Instead of encoding the complete actual MVs in the bitstream, the video encoder 200 uses MV prediction to generate predicted MVs, and the difference between the MVs used for motion compensation and the predicted MVs is encoded as residual motion data and stored in the bitstream 295.

The MV prediction module 275 generates the predicted MVs based on reference MVs that were generated for encoding previously video frames, i.e., the motion compensation MVs that were used to perform motion compensation. The MV prediction module 275 retrieves reference MVs from previous video frames from the MV buffer 265. The video encoder 200 stores the MVs generated for the current video frame in the MV buffer 265 as reference MVs for generating predicted MVs.

The MV prediction module 275 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 295 by the entropy encoder 290.

The entropy encoder 290 encodes various parameters and data into the bitstream 295 by using entropy-coding techniques such as context-adaptive binary arithmetic coding (CABAC) or Huffman encoding. The entropy encoder 290 encodes various header elements, flags, along with the quantized transform coefficients 212, and the residual motion data as syntax elements into the bitstream 295. The bitstream 295 is in turn stored in a storage device or transmitted to a decoder over a communications medium such as a network.

The in-loop filter 245 performs filtering or smoothing operations on the reconstructed pixel data 217 to reduce the artifacts of coding, particularly at boundaries of pixel blocks. In some embodiments, the filtering operation performed includes sample adaptive offset (SAO). In some embodiment, the filtering operations include adaptive loop filter (ALF).

In some embodiments, the entropy encoder 290 signals or encodes slice information syntax elements into the bitstream 295. Slice information syntax elements such as ph_slice_B_present_flag, ph_slice_P_present_flag, ph_slice_I_present_flag, and ph_mixed_slice_types_in_pic_flag are encoded into picture headers associated with video pictures. The entropy encoder 290 may bypass or omit encoding certain syntax elements based on the types of slices that may or may not be present according to the signaled slice information syntax elements.

Figure 3:
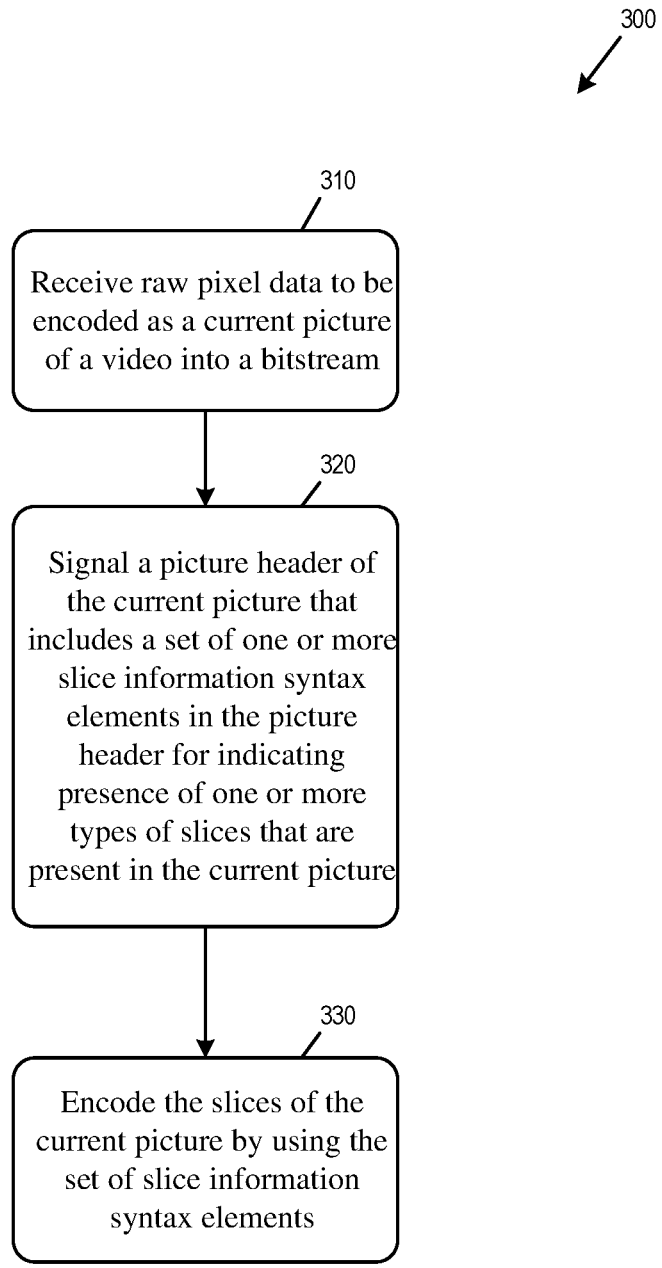
FIG. 3 conceptually illustrates a process for signaling one or more syntax elements in a picture header for indicating the slice types that may be present in the current picture.

FIG. 3 conceptually illustrates a process 300 for signaling one or more syntax elements in a picture header for indicating the slice types that may be present in the current picture. In some embodiments, one or more processing units (e.g., a processor) of a computing device implements the encoder 200 performs the process 300 by executing instructions stored in a computer readable medium. In some embodiments, an electronic apparatus implementing the encoder 200 performs the process 300.

The encoder receives (at block 310) raw pixel data to be encoded as a current picture of a video into a bitstream. The encoder signals (at block 320) a picture header of the current picture that includes a set of one or more slice information syntax elements in the picture header for indicating presence of one or more types of slices that are present in the current picture.

The set of slice information syntax elements may indicate whether a particular type of slice is present in the current picture (e.g., ph_slice_B_present_flag indicates B-type slice is present in the current picture, etc.) The set of slice information syntax elements may include one or more syntax element for indicating (i) whether a first type of slice is present in the current picture and (ii) whether a second, different type of slice is present in the current picture. A slice of the first type of slices does not refer to information in pictures other than the current picture (e.g., intra slice or I-slice) and a slice of the second type of slices refers to information in pictures other than the current picture (e.g., inter slice, B or P slices).

When signaling the picture header, the video encoder may bypass parsing picture header syntax elements related to coding tools that are not associated with the one or more types of slices present in the current picture that are identified by the set of slice information syntax elements.

The encoder encodes (at block 330) the slices of the current picture by using the set of slice information syntax elements. In some embodiments, the set of slice information syntax elements includes a multi-slice-type syntax element that indicates whether the current picture includes slices of more than one slice types (e.g., ph_mixed_slice_types_in_pic_flag indicates that a mix of multiple slice types may be present in the current picture.) In some embodiments, a slice header of a slice of the current picture indicates a slice type when the multi-slice-type syntax element indicates that the current picture includes slices of more than one slice types. In some embodiments, the current picture refers to a picture parameter set (PPS) that includes a PPS syntax element that indicates whether slices of different slice types are allowed in the current picture (e.g., pps_mixed_slice_types_in_pic_flag). The picture header of the current picture includes the multi-slice-type syntax element when the PPS syntax element indicates that slices of more than one slice types are allowed.

III. Example Video Decoder

Figure 4:
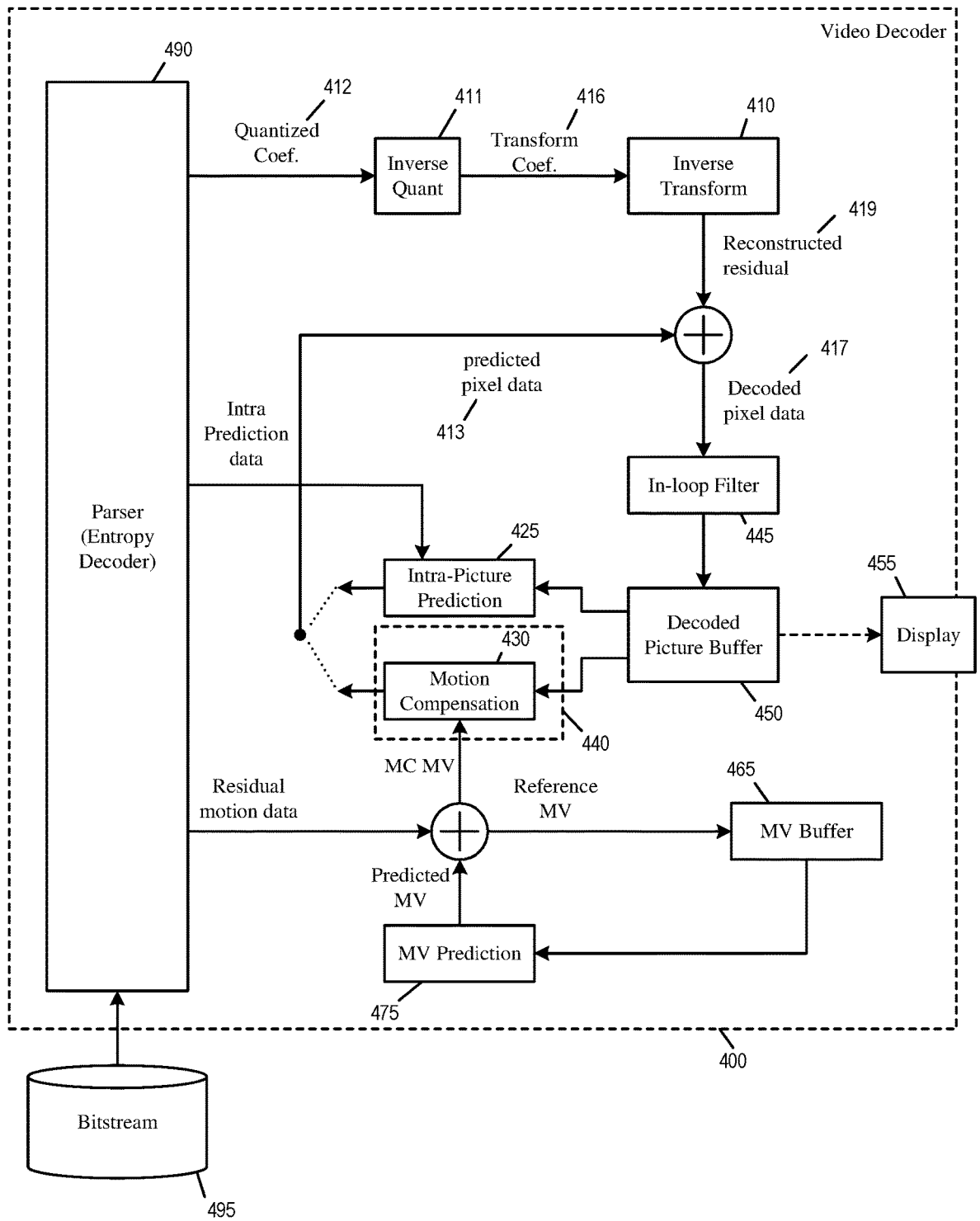
FIG. 4 illustrates an example video decoder.

FIG. 4 illustrates an example video decoder 400. As illustrated, the video decoder 400 is an image-decoding or video-decoding circuit that receives a bitstream 495 and decodes the content of the bitstream into pixel data of video frames for display. The video decoder 400 has several components or modules for decoding the bitstream 495, including some components selected from an inverse quantization module 411, an inverse transform module 410, an intra-prediction module 425, a motion compensation module 430, an in-loop filter 445, a decoded picture buffer 450, a MV buffer 465, a MV prediction module 475, and a parser 490. The motion compensation module 430 is part of an inter-prediction module 440.

In some embodiments, the modules 410-490 are modules of software instructions being executed by one or more processing units (e.g., a processor) of a computing device. In some embodiments, the modules 410-490 are modules of hardware circuits implemented by one or more ICs of an electronic apparatus. Though the modules 410-490 are illustrated as being separate modules, some of the modules can be combined into a single module.

The parser 490 (or entropy decoder) receives the bitstream 495 and performs initial parsing according to the syntax defined by a video-coding or image-coding standard. The parsed syntax element includes various header elements, flags, as well as quantized data (or quantized coefficients) 412. The parser 490 parses out the various syntax elements by using entropy-coding techniques such as context-adaptive binary arithmetic coding (CABAC) or Huffman encoding.

The inverse quantization module 411 de-quantizes the quantized data (or quantized coefficients) 412 to obtain transform coefficients, and the inverse transform module 410 performs inverse transform on the transform coefficients 416 to produce reconstructed residual signal 419. The reconstructed residual signal 419 is added with predicted pixel data 413 from the intra-prediction module 425 or the motion compensation module 430 to produce decoded pixel data 417. The decoded pixels data are filtered by the in-loop filter 445 and stored in the decoded picture buffer 450. In some embodiments, the decoded picture buffer 450 is a storage external to the video decoder 400. In some embodiments, the decoded picture buffer 450 is a storage internal to the video decoder 400.

The intra-prediction module 425 receives intra-prediction data from bitstream 495 and according to which, produces the predicted pixel data 413 from the decoded pixel data 417 stored in the decoded picture buffer 450. In some embodiments, the decoded pixel data 417 is also stored in a line buffer (not illustrated) for intra-picture prediction and spatial MV prediction.

In some embodiments, the content of the decoded picture buffer 450 is used for display. A display device 455 either retrieves the content of the decoded picture buffer 450 for display directly, or retrieves the content of the decoded picture buffer to a display buffer. In some embodiments, the display device receives pixel values from the decoded picture buffer 450 through a pixel transport.

The motion compensation module 430 produces predicted pixel data 413 from the decoded pixel data 417 stored in the decoded picture buffer 450 according to motion compensation MVs (MC MVs). These motion compensation MVs are decoded by adding the residual motion data received from the bitstream 495 with predicted MVs received from the MV prediction module 475.

The MV prediction module 475 generates the predicted MVs based on reference MVs that were generated for decoding previous video frames, e.g., the motion compensation MVs that were used to perform motion compensation. The MV prediction module 475 retrieves the reference MVs of previous video frames from the MV buffer 465. The video decoder 400 stores the motion compensation MVs generated for decoding the current video frame in the MV buffer 465 as reference MVs for producing predicted MVs.

The in-loop filter 445 performs filtering or smoothing operations on the decoded pixel data 417 to reduce the artifacts of coding, particularly at boundaries of pixel blocks. In some embodiments, the filtering operation performed includes sample adaptive offset (SAO). In some embodiment, the filtering operations include adaptive loop filter (ALF).

In some embodiments, the entropy decoder 490 parses or decodes slice information syntax elements from the bitstream 495. Slice information syntax elements such as ph_slice_B_present_flag, ph_slice_P_present_flag, ph_slice_I_present_flag, and ph_mixed_slice_types_in_pic_flag are parsed from picture headers associated video pictures. The entropy decoder 490 may bypass or omit decoding or parsing certain syntax elements based on the types of slices that may or may not be present according to the slice information syntax elements signaled in the picture headers.

Figure 5:
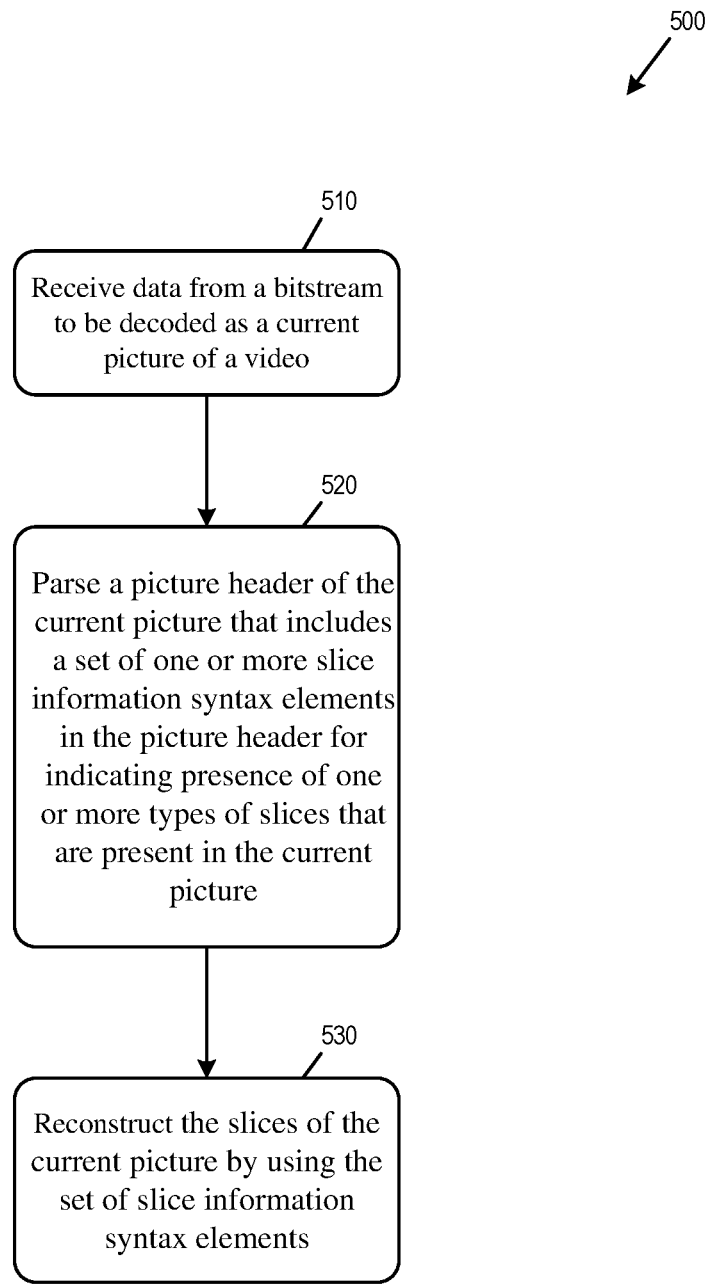
FIG. 5 conceptually illustrates a process for using one or more syntax elements in a picture header for indicating the slice types that may be present in the current picture.

FIG. 5 conceptually illustrates a process 500 for using one or more syntax elements in a picture header for indicating the slice types that may be present in the current picture. In some embodiments, one or more processing units (e.g., a processor) of a computing device implements the decoder 400 performs the process 500 by executing instructions stored in a computer readable medium. In some embodiments, an electronic apparatus implementing the decoder 400 performs the process 500.

The decoder receives (at block 510) data from a bitstream to be decoded as a current picture of a video. The decoder parses (at block 520) a picture header of the current picture that includes a set of one or more slice information syntax elements in the picture header for indicating presence of one or more types of slices that are present in the current picture. The set of slice information syntax elements may indicate whether a particular type of slice is present in the current picture (e.g., ph_slice_B_present_flag indicates B-type slice is present in the current picture, etc.) The set of slice information syntax elements may include one or more syntax element for indicating (i) whether a first type of slice is present in the current picture and (ii) whether a second, different type of slice is present in the current picture, where a slice of the first type of slices does not refer to information in pictures other than the current picture (e.g., slice type I) and a slice of the second type of slices refers to information in pictures other than the current picture (e.g., slice types B and P).

When parsing the picture header, the video decoder may bypass parsing picture header syntax elements related to coding tools that are not associated with the one or more types of slices present in the current picture that are identified by the set of slice information syntax elements.

The decoder reconstructs (at block 530) the slices of the current picture by using the set of slice information syntax elements. In some embodiments, the set of slice information syntax elements includes a multi-slice-type syntax element that indicates whether the current picture includes slices of more than one slice types (e.g., ph_mixed_slice_types_in_pic_flag indicates that a mix of multiple slice types may be present in the current picture.) In some embodiments, a slice header of a slice of the current picture indicates a slice type when the multi-slice-type syntax element indicates that the current picture includes slices of more than one slice types. In some embodiments, the current picture refers to a picture parameter set (PPS) that includes a PPS syntax element that indicates whether slices of different slice types are allowed in the current picture (e.g., pps_mixed_slice_types_in_pic_flag). The picture header of the current picture includes the multi-slice-type syntax element when the PPS syntax element indicates that slices of more than one slice types are allowed.

IV. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 6:
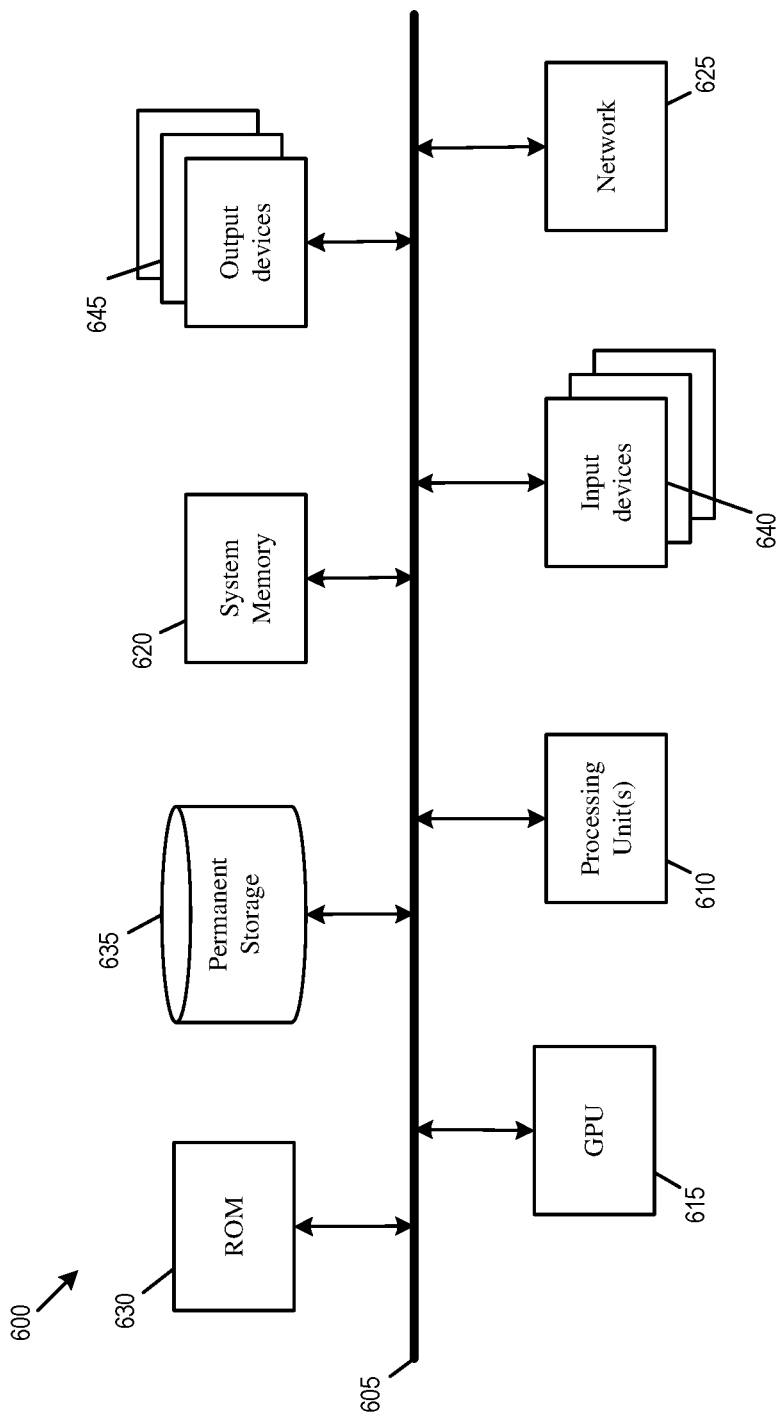
FIG. 6 conceptually illustrates an electronic system with which some embodiments of the present disclosure are implemented.

FIG. 6 conceptually illustrates an electronic system 600 with which some embodiments of the present disclosure are implemented. The electronic system 600 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 600 includes a bus 605, processing unit(s) 610, a graphics-processing unit (GPU) 615, a system memory 620, a network 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the GPU 615, the read-only memory 630, the system memory 620, and the permanent storage device 635.

From these various memory units, the processing unit(s) 610 retrieves instructions to execute and data to process in order to execute the processes of the present disclosure. The processing unit(s) may be a single processor or a multi-core processor in different embodiments. Some instructions are passed to and executed by the GPU 615. The GPU 615 can offload various computations or complement the image processing provided by the processing unit(s) 610.

The read-only-memory (ROM) 630 stores static data and instructions that are used by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the present disclosure use a mass-storage device (such as a magnetic or optical disk and its corresponding disk drive) as the permanent storage device 635.

Other embodiments use a removable storage device (such as a floppy disk, flash memory device, etc., and its corresponding disk drive) as the permanent storage device. Like the permanent storage device 635, the system memory 620 is a read-and-write memory device. However, unlike storage device 635, the system memory 620 is a volatile read-and-write memory, such a random access memory. The system memory 620 stores some of the instructions and data that the processor uses at runtime. In some embodiments, processes in accordance with the present disclosure are stored in the system memory 620, the permanent storage device 635, and/or the read-only memory 630. For example, the various memory units include instructions for processing multimedia clips in accordance with some embodiments. From these various memory units, the processing unit(s) 610 retrieves instructions to execute and data to process in order to execute the processes of some embodiments.

The bus 605 also connects to the input and output devices 640 and 645. The input devices 640 enable the user to communicate information and select commands to the electronic system. The input devices 640 include alphanumeric keyboards and pointing devices (also called "cursor control devices"), cameras (e.g., webcams), microphones or similar devices for receiving voice commands, etc. The output devices 645 display images generated by the electronic system or otherwise output data. The output devices 645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 6, bus 605 also couples electronic system 600 to a network 625 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewriTable 10ompact discs (CD-RW), read-only digital versatile discs (e.g., DVD-ROM, dual-layer DVD-ROM), a variety of recordable/rewriTable 11VDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is execuTable 9y at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 3 and FIG. 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interacTable and/or wirelessly interacting components and/or logically interacting and/or logically interacTable 10omponents.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:
   receiving data from a bitstream to be decoded as a current picture of a video, the bitstream comprising data of a plurality of pictures of the video;
   parsing a picture header of the current picture, the picture header comprising a set of one or more slice information syntax elements for indicating if one or more types of slices are allowed to be present in the current picture; and
   parsing a slice header of a slice of the current picture based on the set of slice information syntax elements, wherein the parsing of the slice header comprises determining a slice type of the slice,
   wherein the set of slice information syntax elements includes a multi-slice-type syntax element that indicates whether the current picture is allowed to include slices of more than one slice type.

2. The video decoding method of claim 1, further comprising: bypassing parsing picture header syntax elements that are not associated with the one or more types of slices present in the current picture that are identified by the set of slice information syntax elements.

3. The video decoding method of claim 1, wherein the set of slice information syntax elements indicates whether a particular type of slice is allowed to be present in the current picture.

4. The video decoding method of claim 1, wherein the set of slice information syntax elements comprises one or more syntax elements for indicating whether a first type of slice is allowed to be present in the current picture and (ii) whether a second, different type of slice is allowed to be present in the current picture.

5. The video decoding method of claim 4, wherein a slice of the first type of slices does not refer to information in pictures other than the current picture and a slice of the second type of slices refers to information in pictures other than the current picture.

6. The video decoding method of claim 1, wherein the parsing of the slice header comprises parsing one or more syntax elements in the slice header when the multi-slice-type syntax element indicates that the current picture is allowed to include slices of more than one slice types.

7. The video decoding method of claim 1, wherein the current picture refers to a picture parameter set (PPS) that includes a PPS syntax element that indicates whether slices of different slice types are allowed in the current picture, and wherein the multi-slice-type syntax element is parsed when the PPS syntax element indicates that slices of more than one slice types are allowed.

8. A video encoding method, comprising:
   receiving raw pixel data to be encoded as a current picture of a video into a bitstream, the bitstream comprising data of a plurality of pictures of the video;
   signaling a picture header of the current picture, the picture header comprising a set of one or more slice information syntax elements for indicating if one or more types of slices are allowed to be present in the current picture; and
   parsing a slice header of a slice of the current picture based on the set of slice information syntax elements, wherein the parsing of the slice header comprises determining a slice type of the slice,
   wherein the set of slice information syntax elements includes a multi-slice-type syntax element that indicates whether the current picture is allowed to include slices of more than one slice type.

9. An electronic apparatus, comprising:
   a video decoder circuit configured to perform operations comprising:

receiving data from a bitstream to be decoded as a current picture of a video, the bitstream comprising data of a plurality of pictures of the video;

parsing a picture header of the current picture, the picture header comprising a set of one or more slice information syntax elements for indicating if one or more types of slices are allowed to be present in the current picture; and parsing a slice header of a slice of the current picture based on the set of slice information syntax elements, wherein the parsing of the slice header comprises determining a slice type of the slice, wherein the set of slice information syntax elements includes a multi-slice-type syntax element that indicates whether the current picture is allowed to include slices of more than one slice type.

* * * * *